US006114486A

United States Patent [19]
Rowland et al.

[11] Patent Number: 6,114,486
[45] Date of Patent: *Sep. 5, 2000

[54] RHEOLOGY-MODIFIED POLYOLEFINS

[75] Inventors: Michael E. Rowland; Robert R. Turley, both of Lake Jackson; James J. Hill, Angleton; Lawrence T. Kale; Kyle G. Kummer, both of Lake Jackson; Shih-Yaw Lai, Sugar Land; Pak-Wing Steve Chum, Lake Jackson, all of Tex.

[73] Assignee: The Dow Chemical Company, Midland, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 08/807,554

[22] Filed: Feb. 28, 1997

Related U.S. Application Data

[60] Provisional application No. 60/012,873, Mar. 5, 1996.

[51] Int. Cl.$^7$ .................................................. C08F 110/02
[52] U.S. Cl. .................. 526/352; 525/333.7; 525/333.8; 525/387
[58] Field of Search ................ 526/352; 525/333.7, 525/333.8, 387

[56] References Cited

U.S. PATENT DOCUMENTS

| | | | |
|---|---|---|---|
| 3,909,463 | 9/1975 | Hartman | 260/2.5 F |
| 3,953,655 | 4/1976 | Steinkamp et al. | 428/474 |
| 4,460,750 | 7/1984 | Thiersault et al. | 525/333.8 |
| 4,525,257 | 6/1985 | Kurtz et al. | 204/159 |
| 4,578,431 | 3/1986 | Shaw et al. | 525/387 |
| 4,598,128 | 7/1986 | Randall et al. | 525/240 |
| 4,722,973 | 2/1988 | Yamaoka et al. | 525/240 |
| 4,737,547 | 4/1988 | White | 525/193 |
| 5,272,236 | 12/1993 | Lai et al. | 526/348.5 |
| 5,578,682 | 11/1996 | White | 525/282 |
| 5,736,618 | 4/1998 | Poloso | 525/387 |
| 5,824,718 | 10/1998 | Penfold et al. | 522/120 |

FOREIGN PATENT DOCUMENTS

| | | | |
|---|---|---|---|
| 1203948 | 4/1986 | Canada | C08K 5/14 |
| 0 145 475 A2 | 6/1985 | European Pat. Off. | C08J 3/28 |
| 0 451 804 A2 | 10/1991 | European Pat. Off. | C08J 3/28 |
| 0 497 590 A2 | 8/1992 | European Pat. Off. | C08F 110/06 |
| 0 519 386 A1 | 12/1992 | European Pat. Off. | C08J 3/28 |
| 0 678 527 A2 | 10/1995 | European Pat. Off. | C08F 8/00 |
| 2125004 | 9/1972 | France | C08F 27/00 |
| 59-006241 | 1/1984 | Japan | C08L 23/04 |
| 1362476 | 8/1974 | United Kingdom | C08F 27/00 |
| 85/04664 | 10/1985 | WIPO | C08F 8/50 |
| 93/04486 | 3/1993 | WIPO | H01B 3/44 |
| 94/07930 | 4/1994 | WIPO | C08F 299/00 |
| 96/31563 | 10/1996 | WIPO | C08L 23/26 |

OTHER PUBLICATIONS

Basheer, R., Dole, M., "Radiation Chemistry of Linear Low–Density Polyethylene. I. Gel Formation and Unsaturation Effects", 1983, pp. 949–956, Journal of Polymer Science: Polymer Physics Edition, vol. 21.

Bremner, T., Rudin, A., "Peroxide Modification of Linear Low–Density Polyethylene: A Comparison of Dialkyl Peroxides", 1993, pp. 785–798, Journal of Applied Polymer Science, vol. 49.

Chum, S., "Effects of Vinyl Chain–Ends on the Melt Viscoelastic Properties of Radiation Crosslinked Polyethylene", 1992, pp. 37–47, Journal of Plastic Film & Sheeting, vol. 8.

Kurian, P., et al., "Effect of Controlled Crosslinking on the Mechanical and Rheological Properties of HDPE/LLDPE Blends", 1992, pp. 113–116, Eur. Polym. J., vol. 28, No. 1.

Michiels, D.J., "Advanced Performance Terpolymers for Blown Film Applications", Aug. 1994, pp. 1–8, The 1994 TAPPI Polymers, Laminations and Coatings Conference, Nashville, Tennessee.

Phillips, P.J., et al., Crosslinking of Homogeneous Polyethylenes, May 1–5, 1994, Society of Plastics Engineers Conference Proceedings. vol. II.

Su, T. K. et al., "Chemical Modification of Linear Low Density Polyethylene", 1987, pp. 1271–1275, ANTEC '87.

Suwanda, D. Balke, S., "The Reactive Extrusion of Polyethylene: Process Improvements for Initiator Dispersion", 1990, pp. 1908–1911, ANTEC '90.

Suwanda, D., Balke, S., "The Reactive Modification of Polyethylene. 1: The Effect of Low Initiator Concentrations on Molecular Properties", Dec. 1993, pp. 1585–1591, Polymer Engineering and Science, vol. 33, No. 24.

Tang, Y. et al., "Peroxide Crosslinking of LLDPE During Reactive Extrusion", 1989, pp. 217–225, Advances in Polymer Technology, vol. 9, No. 3.

Primary Examiner—David W. Wu
Assistant Examiner—Ling-Siu Choi

[57] ABSTRACT

The subject invention is directed to a rheology-modified ethylene polymer having less than 0.5 weight percent gel, a composition distribution breadth index (CDBI) greater than 50 percent, and a molecular weight distribution ($M_w/M_n$) of less than 4.0, which is characterized as having improved rheological performance and/or melt strength attributes relative to the unmodified polymer. The subject invention is further directed to polymer blends which comprise the rheology-modified polymers, and to a process for preparing the rheology-modified polymers.

7 Claims, 4 Drawing Sheets

VIRGIN RESINS
$LOG(\tau_0) = 1.0663 \times LOG(\eta_0) - 6.1242$
$r^2: 0.9427$ $\gamma$-IRRADIATED HM1100:
$LOG(\tau_0) = 1.9755 \times LOG(\eta_0) - 9.3570$
$r^2: 0.9732$ $\gamma$-IRRADIATED SM8400:
$LOG(\tau_0) = 2.0146 \times LOG(\eta_0) - 9.0780$
$r^2: 0.9820$

RHEOLOGY-MODIFIED POLYOLEFINS

This application claims benefit of Provisional application Ser. No. 60/012,873 filed Mar. 5, 1996.

BACKGROUND OF THE INVENTION

1. Field of the Invention

This invention relates to rheology-modified thermoplastic polyolefins, processes for making rheology-modified thermoplastic polyolefins and processes for shaping them into molded articles. In particular, this invention relates to rheology-modification of ethylene interpolymers such as ethylene/α-olefin polymers.

2. Description of Related Art

Polymers and numerous additives are typically compounded into formulations which are then totally cross-linked for enhanced strength properties of the finished article. The starting polymer, prior to cross-linking, must have adequate performance properties such that it may be formulated or compounded with various additives and still maintain processability. For example, in a wire and cable coating operation, the composition must have "green strength", also known as "melt strength", to remain on the wire after coating, and not sag or deform on the wire until the composition is cured. Otherwise the wire will have thin spots and the insulating value of the composition is lost. The composition must also undergo a final cure step and achieve good physical properties, such as tensile strength, elongation, and 100% modulus (stress at 100% strain). Typical curing occurs through use of peroxide or irradiation, and for polyethylene in general, the curing through crosslinking phenomenon is well documented (see, for example, Radiation Effects in Materials, A. Charlesby, editor, Pergamon Press, 1960). Polyethylene, especially heterogeneous linear low density polyethylene (LLDPE), when exposed to peroxide and/or radiation under proper conditions, forms gels as the molecular weight builds.

Usually the polymer selected to compatibilize all of the various components used in wire and cable coating operations is an elastomer such as ethylene/propylene rubber (EPR) or ethylene/propylene diene monomer terpolymer (EPDM). These types of very low density polymers (i.e., polymers typically having a density less than 0.92 g/cm$^3$) are relatively expensive (as compared with traditional linear low density polyethylene polymers) and contain a very high percentage by weight of comonomer(s) (e.g., propylene, dienes). Lowering the density of the polymer also increases the ability of the polymer to hold more filler and oil.

There have been a few recent announcements regarding new polymers which are said to be effective substitutes for EPR and EPDM. Union Carbide Chemicals and Plastics, Inc., announced in 1990 that they have developed a new cost effective class of polyolefins trademarked Flexomer™ Polyolefins that could replace expensive EPR or EPDM rubbers. These new polyolefins are said to have bridged the gap between rubbers and polyethylene, having moduli between the two ranges.

While the development of new lower modulus polymers such as Flexomer™ Polyolefins by Union Carbide or Exact™ polymers by Exxon has aided the elastomeric formulation marketplace, there continues to be a need for other more advanced, cost-effective polymers which can ultimately be fully cross-linked to form a polymer aggregate such that the bulk polymer is a covalently bonded network of polymer chains, but which also have good physical properties and processability prior such to complete cross-linking.

Others have attempted to modify polyolefins in various ways to try to achieve such goals. For example, in Chemical Modification of Linear Low Density Polyethylene, by T. K. Su, R. G. Shaw, P. J. Canterino, E. A. Colombo and T. H. Kwack, published in ANTEC '87 SPE Technical Papers, vol. 33, pp. 1271–1275, linear low density polyethylene (LLDPE) was crosslinked using peroxide free-radical initiation. This modification is said to result in chemically modified LLDPE without creating gels. However, Su et al. also report that peroxide modification of LLDPE results in higher apparent viscosity throughout the range of shear rate (see FIG. 2 of Su et al.). This change in viscosity indicates growing molecular weight as a result of the peroxide modification and results in modified LLDPE which does not have the same processability as the unmodified LLDPE, especially in the high shear range.

In PCT/GB85/00142 (published as WO 85/04664) ("PCT '142" herein), LLDPE is treated to enhance the polymers' suitability for extrusion conversion into hollow articles (e.g., tubes, sheathing, and wire and cable insulators). PCT '142 states that treating LLDPE having a melt index over 3 g/10 minutes with "moderate quantities of peroxide does not bring about an adequate broadening of molecular weight distribution and may lead to treated LLDPE's whose mechanical properties are unsatisfactory." Further, these treated LLDPE's are said to produce finished extruded articles which have a "non-uniform wall and a rough surface" as a result of "shark-skin" melt fracture. PCT '142 allegedly solves the difficulty by using thermo-mechanical treatment of the LLDPE in a molten state. The treatment involves introducing LLDPE having a density of 0.9 to 0.935 g/cm$^3$ and a melt index over 3 dg/minute as a powder into a thermomechanical apparatus of an extruder while simultaneously introducing an organic peroxide at a level of over 0.05% and less than 1% (by weight of the polymer).

U.S. Pat. No. 4,598,128 (Randall et al.) describes ethylene polymer compositions being a blend of a first and second ethylene polymer. The second ethylene polymer is characterized by molecules having long chain Y-branches. Both polyethylenes can be made using the high pressure process (producing homopolymer low density polyethylene (LDPE)) or in a low pressure process (producing linear polyethylene having essentially no long chain branching). The blend can be prepared by using an extrusion process in which a portion of the polyethylene is irradiated and both the irradiated and non-irradiated polymers subsequently melt blended. The long chain Y-branched polymer is said to have a broad molecular weight distribution. The resultant blended composition is also said to have altered Theological properties without significantly increasing the molecular weight of the polymers. The compositions are said to be useful for coatings and production of shaped and molded articles (e.g., pipes, gas tanks and other molded auto parts).

While there have been several attempts at increasing the processability of linear heterogeneously branched polyethylene through use of irradiation, there continues to be a need for cost effective modification of polyethylene such that the resultant modified polymer is still useful for thermoplastic molding processes. In particular, there is a need for polyolefins having one or more improved processing characteristics such as higher zero shear viscosity, low high shear viscosities, improved melt flow ($I_{10}/I_2$) properties, improved critical shear rate at onset of surface melt fracture, improved critical shear stress at onset of gross melt fracture, improved rheological processing index (PI), improved melt strength, higher green strength, greater filler/plasticizer/oil loading capabilities, and/or improved peroxide cure efficiency, while maintaining or improving physical properties such as tensile strength, impact strength, modulus of elasticity and relaxation time. In blown film processes high bubble stability, particularly combined with high polymer throughput, is a particularly desirable objective and in cast film and extrusion molding processes the ability to increase or maintain the polymer throughput rate and/or reduce or maintain extruder back pressure while improving draw down and/or reducing neck in is particularly desired.

SUMMARY OF THE INVENTION

These and other desired goals are satisfied by ethylene polymers selected and modified according to the present invention.

One aspect of this invention is directed to a rheology-modified ethylene polymer having less than 0.5 wt % gel as measured via ASTM D2765, Procedure A, a Composition Distribution.Branch Index (CBDI) greater than 50 percent and a molecular weight distribution less than 4.0, which is characterizable by one of the following equations:

$$Z \leq (\log \eta_{0.1} - \log \eta_{100}) \log \eta_{100} \quad (I)$$

$$\log \tau_0 = m \cdot \log(\eta_0) - b \quad (II)$$

$$K \leq MS^{150\,C} - 72.079 \times (\log M_w)^2 + 666.28 \times (\log M_w) - 1539.5 \quad (III)$$

wherein $\eta_0$ is the zero shear rate viscosity of the polymer, $\eta_{0.1}$ is the viscosity of the polymer measured at 190 C. and a shear rate of 0.1 radians/second, $\eta_{100}$ is the viscosity of the polymer at a shear rate of 100 radian/second, $\tau_0$ is the relaxation time of the polymer, Z, also referred to herein as the log viscosity ratio, is a number having a value of 0.30, m is a number having a value greater than or equal to 1.070, b is a number having a value less than or equal to 5.950, K, also referred to herein as the melt strength improvement constant, is a number equal to 0.50, $MS^{150C}$ is the melt strength of the rheology-modified polymer in centiNewtons (cN) at 150 C. and $M_w$ is the weight average molecular weight of the rheology-modified polymer as measured via gel permeation chromatography (GPC).

Another aspect of this invention is directed to a process for improving the processability of a thermoplastic ethylene polymer comprising treating at least one thermoplastic ethylene polymer having a molecular weight distribution less than 3.00 and a CBDI greater than 50 percent with a crosslinking agent in an amount less than the amount which would cause greater than or equal to 0.5 wt % gel formation under melt processing conditions wherein the process satisfies the condition:

$$\log \eta_{0.1}{}^m \geq \log \eta_{0.1}{}^v + x \quad (IV) \text{ and}$$

$$\log \eta_{100}{}^m \leq \log \eta_{100}{}^v + y \quad (V)$$

wherein $\eta_{0.1}{}^m$ and $\eta_{100}{}^m$ are the viscosities of the modified polymer in poise measured at 190 C. and shear rates of 0.1 and 100 radian/second, respectively, $\eta_{0.1}{}^v$ and $\eta_{100}{}^v$ are the viscosities of the unmodified polymer (i.e., the "virgin" polymer) in poise measured at 190 C. and shear rates of 0.1 and 100 radian/second, respectively, x is a number having a value of 0.50 and y is a number having a value of 0.10;

$$\log \tau_0{}^m \geq \log \tau_0{}^v + 0.1 \quad (VI)$$

wherein $\log \tau_0{}^m$ and $\log \tau_0{}^v$ are log relaxation times of the rheology-modified polymer and the polymer prior to modification, respectively; or $$MS^m \geq MS^v + 0.5 \; cN \quad (VII)$$

wherein $MS^m$ and $MS^v$ are melt strengths in cN at 150 C. of the rheology-modified polymer and the same polymer prior to modification, respectively.

Another aspect of this invention is directed to an improved process for making a molded article comprising:

a) treating at least one thermoplastic ethylene polymer having a molecular weight distribution less than 3.00 and a CBDI greater than 50 percent with a crosslinking agent;

b) heating the treated polymer to a temperature suitable for melt processing;

c) melt processing the heated polymer;

d) forming the melt processed polymer into a shape and e) allowing the shaped polymer to cool, wherein the amount of crosslinking agent used in step (a) is less than that which would cause greater than or equal to 0.5 wt % gel formation under the melt processing conditions of step (c) and yet sufficient to satisfy the condition:

$$\log \eta_{0.1}{}^m \geq \log \eta_{0.1}{}^v + x \quad (IV) \text{ and}$$

$$\log \eta_{100}{}^m \leq \log \eta_{100}{}^v + y \quad (V)$$

wherein $\eta_{0.1}{}^m$ and $\eta_{100}{}^m$ are the viscosities of the modified polymer in poise measured at 190 C. and shear rates of 0.1 and 100 radian/second, respectively, $\eta_{0.1}{}^v$ and $\eta_{100}{}^v$ are the viscosities of the unmodified polymer (i.e., the "virgin" polymer) in poise measured at 190 C. and shear rates of 0.1 and 100 radian/second, respectively, x is a number having a value of 0.50 and y is a number having a value of 0.10;

$$\log \tau_0{}^m \geq \log \tau_0{}^v + 0.1 \quad (VI)$$

wherein $\log \tau_0{}^m$ and $\log \tau_0{}^v$ are log relaxation times of the rheology-modified polymer and the polymer prior to modification, respectively; or $$MS^m \geq MS^v + 0.5 \; cN \quad (VII)$$

wherein $MS^m$ and $MS^v$ are melt strengths in cN at 150 C. of the rheology-modified polymer and the same polymer prior to modification, respectively.

Yet another aspect of the present invention is directed to improved intermediates for making molded articles comprising a thermoplastic ethylene polymer having a CBDI greater than 50 percent treated with a crosslinking agent in an amount less than sufficient to cause the formation of 0.5 wt % or more gel under melt processing conditions and yet sufficient to satisfy the condition:

$$\log \eta_{0.1}{}^m \geq \log \eta_{0.1}{}^v + x \quad (IV) \text{ and}$$

$$\log \eta_{100}{}^m \leq \log \eta_{100}{}^v + y \quad (V)$$

wherein $\eta_{0.1}{}^m$ and $\eta_{100}{}^m$ are the viscosities of the modified polymer in poise measured at 190 C. and shear rates of 0.1 and 100 radian/second, respectively, $\eta_{0.1}{}^v$ and $\eta_{100}{}^v$ are the viscosities of the unmodified polymer (i.e., the "virgin" polymer) in poise measured at 190 C. and shear rates of 0.1 and 100 radian/second, respectively, x is a number having a value of 0.50 and y is a number having a value of 0.10;

$$\log \tau_o{}^m \geq \log \tau_0{}^v + 0.1 \quad (VI)$$

wherein $\log \tau_0{}^m$ and $\log \tau_0{}^v$ are log relaxation times of the rheology-modified polymer and the polymer prior to modification, respectively; or $$MS^m \geq MS^v + 0.5 \; cN \quad (VII)$$

wherein $MS^m$ and $MS^v$ are melt strengths measured in cN at 150 C. of the rheology-modified polymer and the same polymer prior to modification, respectively.

Yet another aspect of this invention is a method of using the intermediates described above in a method for making an article comprising a polymer.

DETAILED DESCRIPTION OF THE INVENTION

1. Basic Definitions

Figure 1:
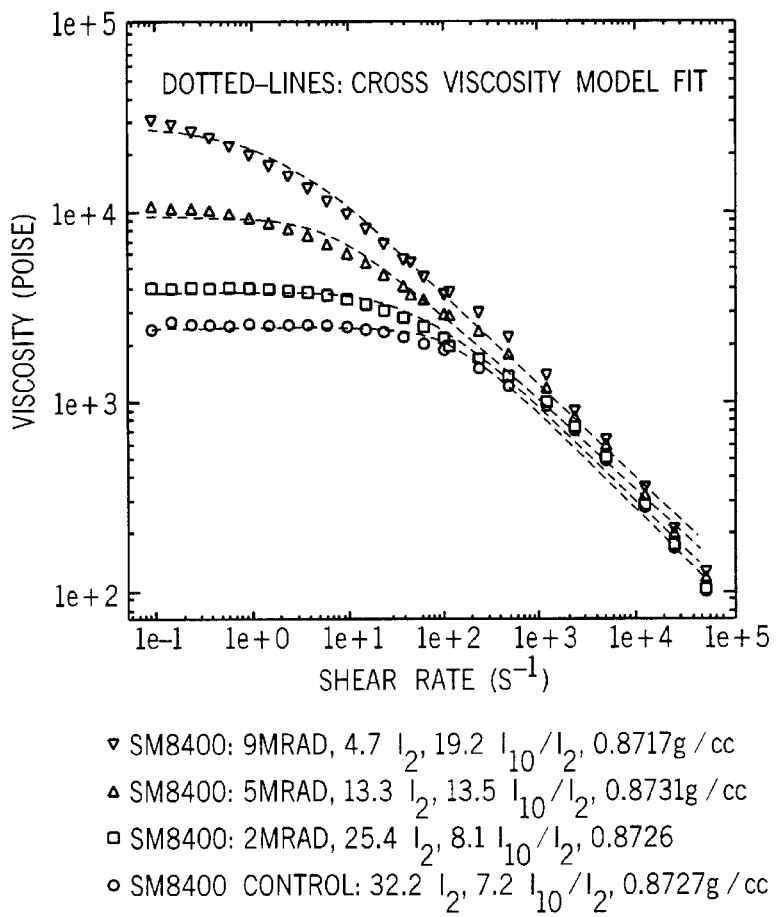
FIG. 1 shows plots of viscosity versus shear rate before and after modification with varying dosages of γ-radiation for a substantially linear ethylene 1-octene copolymer elastomer known as SM 8400 having a density of 0.873 g/cm$^3$, a melt index of 32 dg/min., and a molecular weight distribution, $M_w/M_n$, of about 2 prior to rheology modification. SM 8400 is a substantially linear ethylene polymer commercially available from The Dow Chemical Company under the trademark Affinity™.
Figure 2:
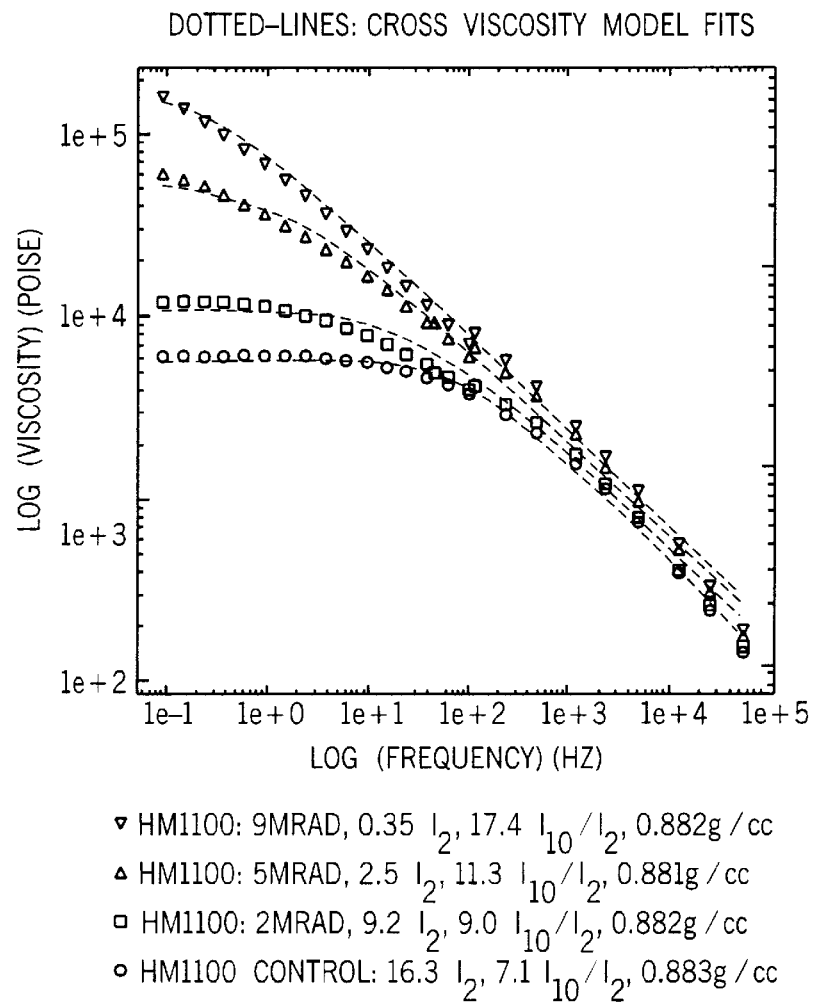
FIG. 2 shows plots of viscosity versus shear rate before and after modification with the same dosages of γ-radiation as used to generate the data of FIG. 1 for a substantially linear ethylene 1-octene copolymer plastomer known as HM 1100 having a density of 0.883 g/cm$^3$, a melt index of 16.3 dg/min., and a molecular weight distribution, $M_w/M_n$, of about 2 prior to rheology modification. HM 1100 is also commercially available from The Dow Chemical Company under the trademark Affinity™.
Figure 3:
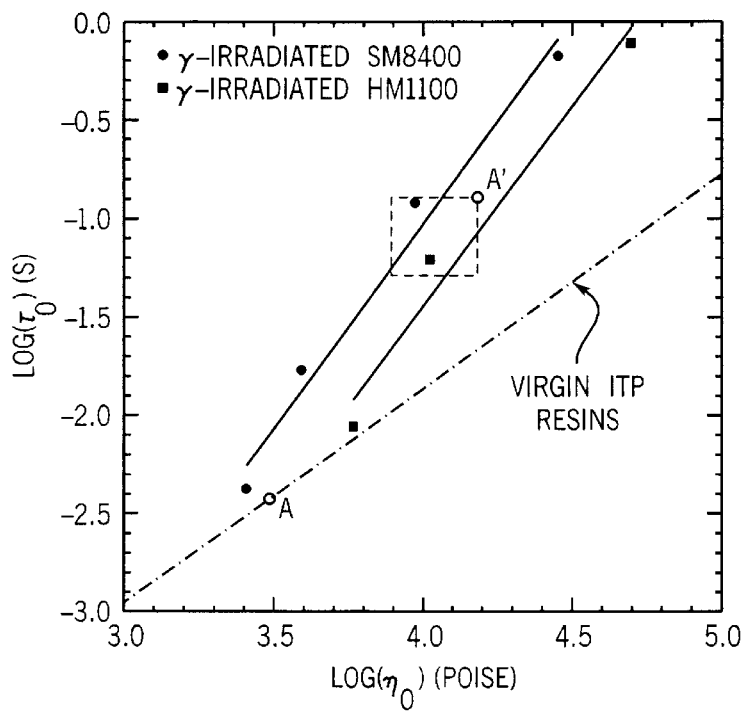
FIG. 3 shows a best linear fit via least squares analysis of log relaxation time (log $\tau_0$) versus log zero shear rate viscosity (log $\tau_0$) in poise for SM 8400 and HM 1100. $\tau_0$ and $\eta_0$ are obtained from fitting viscosity data such as shown in FIGS. 1 and 2 to the Cross equation $\eta/\eta_0 = 1/(1+(\gamma \cdot \tau_0)^{1-n})$ in which $\eta$ and $\gamma$ are the measured shear viscosity and corresponding shear rate, respectively, and n is the power law index of the material.
Figure 4:
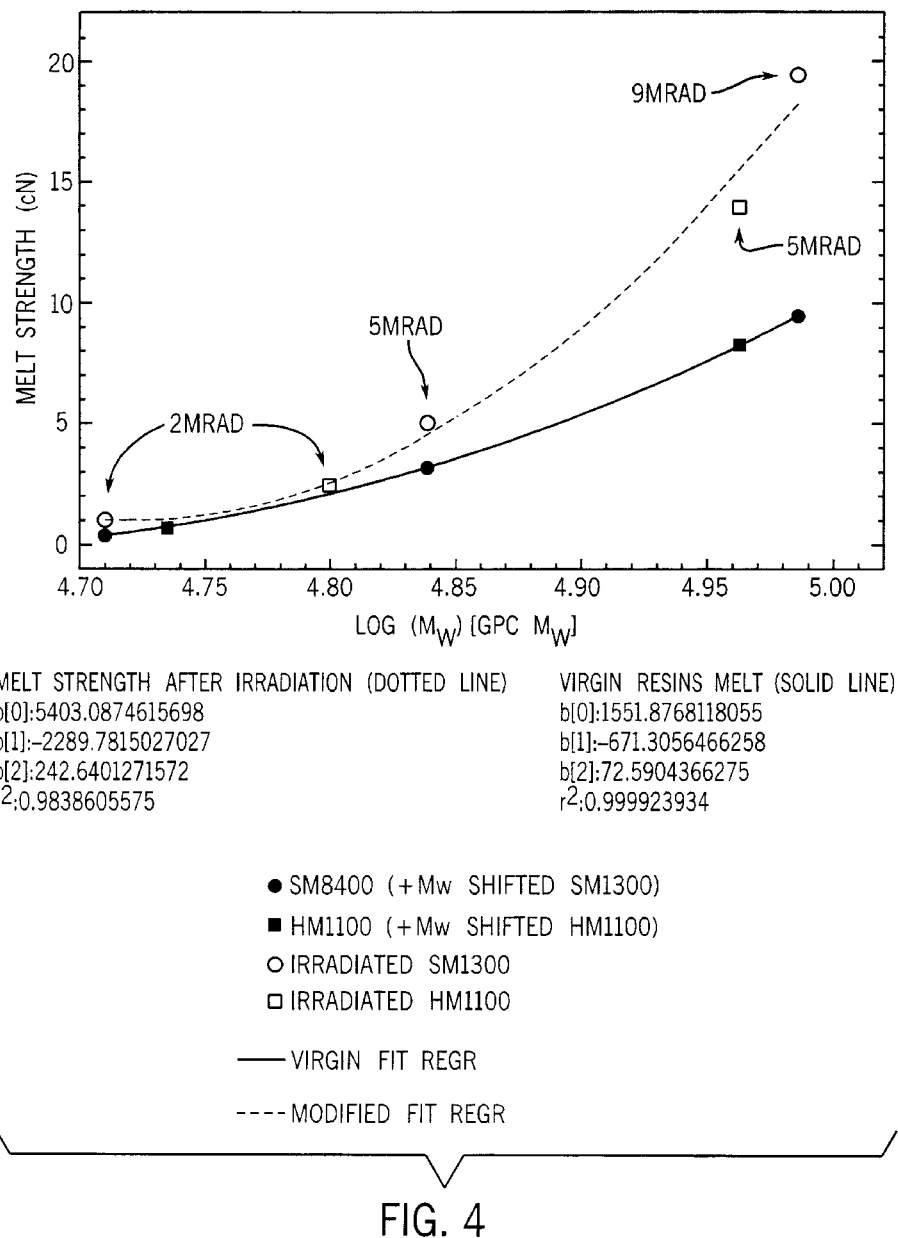
FIG. 4 shows plots of melt strength in cN at 150 C. relative to log $M_w$ for SM 8400 and HM 1100 before and after γ-irradiation.

Unless indicated to the contrary, all parts, percentages and ratios are by weight. The expression "up to" when used to specify a numerical range includes any value less than or equal to the numerical value which follows this expression. The expression "wt %" means "weight percent".

The term "polymer" means a compound prepared by polymerizing monomers, whether of the same or a different type. The generic term polymer thus embraces the term "homopolymer", usually employed to refer to polymers prepared from only one type of monomer, and the term "interpolymer", as defined hereinafter.

The term "interpolymer" means polymers prepared by the polymerization of at least two different types of monomers. The generic term "interpolymer" thus includes the term "copolymers", which is usually employed to refer to polymers prepared from two different monomers, as well as to polymers prepared from more than two different types of monomers.

The term "homogeneous" polymers are ethylene interpolymers in which any comonomer is randomly distributed within a given interpolymer molecule and substantially all of the interpolymer molecules have the same ethylene/comonomer ratio within that interpolymer. Homogeneous polymers generally are characterized as having a single melting peak between −30 C. and 150 C., as determined by differential scanning calorimetry (DSC).

Homogeneous polymers will also typically have a molecular weight distribution, $M_w/M_n$, less than or equal to 3 (when the density of the interpolymer is less than about 0.960 g/cc) preferably less than or equal to 2.5.

In addition or in the alternative, the homogeneity of the polymers is typically described by the SCBDI (Short Chain Branch Distribution Index) or CDBI (Composition Distribution Branch Index) and is defined as the weight percent of the polymer molecules having a comonomer content within 50 percent of the median total molar comonomer content. The SCBDI of a polymer is readily calculated from data obtained from techniques known in the art, such as, for example, temperature rising elution fractionation (abbreviated herein as "TREF") as described, for example, in Wild et al, Journal of Polymer Science, Poly. Phys. Ed., Vol. 20, p. 441 (1982), in U.S. Pat. No. 4,798,081 (Hazlitt et al.), or in U.S. Pat. No. 5,089,321 (Chum et al.) the disclosures of all of which are incorporated herein by reference. The SCBDI or CDBI for the homogeneous linear and for the substantially linear ethylene/α-olefin polymers used in the present invention is greater than 50 percent, preferably greater than 70 percent, and more preferably greater than 90 percent.

Heterogeneous polymers are ethylene/α-olefin interpolymers characterized as having a linear backbone and a DSC melting curve having a distinct melting peak greater than 115° C. attributable to a high density fraction. Heterogeneous interpolymers will typically have an $M_w/M_n$ greater than 3 and will typically have a CDBI less than or equal to 50, indicating that such interpolymers are a mixture of molecules having differing comonomer contents and differing amounts of short chain branching.

The term "$I_2$" refers to the melt index of a polymer measured according to ASTM D-1238, Condition 190 C./2.16 kg (formerly known as "Condition (E)").

The term "$I_{10}$" refers to the melt index of a polymer measured according to ASTM D-1238, Condition 190 C./10 kg (formerly known as "Condition (N)").

The expression "melt flow ratio" as used herein means "$I_{10}/I_2$" and provides an indication of the processability of the polymer.

The term "$M_n$" refers to the number average molecular weight of the polymer as determined via gel permeation chromatography.

The term "$M_w$" refers to the weight average molecular weight of the polymer as determined via gel permeation chromatography.

Unless specified otherwise, the expression "molecular weight distribution" refers to the breadth of the molecular weight distribution of the bulk polymer as defined by $M_w/M_n$.

The term "crosslinking" as used herein refers to both tetrafunctional (H-type) long chain branching resulting from a covalent linkage between two polymer molecule backbones and trifunctional (T-type) long chain branching produced when a terminal group of a polymer molecule forms a covalent bond with the backbone of another polymer molecule.

The term "gel" refers to a three-dimensional polymer network which is formed from covalently linked polymer chains. The amount of gel is expressed in terms of weight-percent based on the total weight of the polymer as determined by ASTM D2765, Procedure A.

Unless specified otherwise, the term "viscosity" refers to shear viscosity in poise (dyne.second/cm$^2$). Shear viscosity at shear rates from 0.1 to 100 radians/sec is measured at 190 C. under a nitrogen atmosphere using a dynamic mechanical spectrometer, such as the Rheometrics RMS-800 equipped with 25 mm diameter parallel plates, in the oscillatory shear mode at 15% strain. The dynamic mechanical spectrometer is used to measure $\eta_{0.1}$ and $\eta_{100}$ in Equations (I), (IV) and (V). Shear viscosity may also be measured in the shear range of about 10–4000 sec$^{-1}$ using a capillary rheometer. Poise may be converted to Pascal.second by multiplying by 0.1 Pa.s/poise. The term "cp" refers to centipoise.

The relaxation time, $\tau_0$, and zero shear viscosity, $\eta_0$, of the polymer are the "best fit" values to the Cross equation, i.e., $$\eta/\eta_0 = 1/(1+(\gamma \cdot \tau_0)^{1-n})$$

in which n is the power law index of the material, and $\eta$ and $\gamma$ are the measured shear viscosity and corresponding shear rate, respectively.

2. Homogeneous Ethylene Polymers

The homogeneous polyethylenes that can be rheology modified according to this invention fall into two broad categories, the linear homogeneous polyethylenes and the substantially linear homogeneous polyethylenes. Both are known.

Homogeneous linear ethylene polymers have long been commercially available. As exemplified in U.S. Pat. No. 3,645,992 to Elston, homogeneous linear ethylene polymers can be prepared in conventional polymerization processes using Ziegler-type catalysts such as, for example, zirconium and vanadium catalyst systems. U.S. Pat. No. 4,937,299 to Ewen et al. and U.S. Pat. No. 5,218,071 to Tsutsui et al. disclose the use of metallocene catalysts, such as catalyst systems based on hafnium, for the preparation of homogeneous linear ethylene polymers. Homogeneous linear ethylene polymers are typically characterized as having a molecular weight distribution, $M_w/M_n$, of about 2. Commercially available examples of homogeneous linear ethylene polymers include those sold by Mitsui Petrochemical Industries as Tafmer™ resins and by Exxon Chemical Company as Exact™ resins.

The substantially linear ethylene polymers (SLEPs) are homogeneous polymers having long chain branching. They are disclosed in U.S. Pat. Nos. 5,272,236 and 5,278,272, the disclosures of which are incorporated herein by reference. SLEPs are available from The Dow Chemical Company as polymers made by the Insite™ Process and Catalyst Technology such as Engage™ polyolefin elastomers (POEs) and Affinity™ polyolefin plastomers (POPs). Specific examples of useful Engage™ POEs include SM 8400, EG 8100, and CL 8001 and specific examples of useful Affinity™ POPs include FM-1 570, HM 1100, and SM 1300, each of which is commercially available from The Dow Chemical Company. SLEPs can be prepared via the solution, slurry, or gas phase, preferably solution phase, polymerization of ethylene and one or more optional α-olefin comonomers in the presence of a constrained geometry catalyst, such as is disclosed in European Patent Application 416,815-A, incorporated herein by reference.

The substantially linear ethylene/α-olefin polymers are made by a continuous process using suitable constrained geometry catalysts, preferably constrained geometry catalysts as disclosed in U.S. application Ser. Nos.: 545,403, filed Jul. 3, 1990; 758,654, filed Sep. 12, 1991 Pat. No. 5,132,380; 758,660, filed Sep. 12, 1991 now abandoned; and 720,041, filed Jun. 24 now abandoned, 1991, the teachings of all of which are incorporated herein by reference. The monocyclopentadienyl transition metal olefin polymerization catalysts taught in U.S. Pat. No. 5,026,798, the teachings of which is incorporated herein by reference, are also suitable for use in preparing the polymers of the present invention, so long as the reaction conditions are as specified below.

Suitable cocatalysts for use herein include but are not limited to, for example, polymeric or oligomeric aluminoxanes, especially methyl aluminoxane, as well as inert, compatible, noncoordinating, ion forming compounds. Preferred cocatalysts are inert, noncoordinating, boron compounds.

The expression "continuous process" means a process in which reactants are continuously added and product is continuously withdrawn such that an approximation of a steady state (i.e. substantially constant concentration of reactants and product while carrying out the process) is achieved. The polymerization conditions for manufacturing the substantially linear ethylene/α-olefin polymers of the present invention are generally those useful in the solution polymerization process, although the application of the present invention is not limited thereto. Slurry and gas phase polymerization processes are also believed to be useful, provided the proper catalysts and polymerization conditions are employed.

Multiple reactor polymerization processes can also be used in making the substantially linear olefin polymers and copolymers to be Theologically modified according to the present invention, such as those disclosed in U.S. Pat. No. 3,914,342, incorporated herein by reference. The multiple reactors can be operated in series or in parallel, with at least one constrained geometry catalyst employed in one of the reactors.

The term "substantially linear" means that, in addition to the short chain branches attributable to homogeneous comonomer incorporation, the ethylene polymer is further characterized as having long chain branches in that the polymer backbone is substituted with an average of 0.01 to 3 long chain branches/1000 carbons. Preferred substantially linear polymers for use in the invention are substituted with from 0.01 long chain branch/1000 carbons to 1 long chain branch/1000 carbons, and more preferably from 0.05 long chain branch/1000 carbons to 1 long chain branch/1000 carbons.

In contrast to the term "substantially linear", the term "linear" means that the polymer lacks measurable or demonstrable long chain branches, i.e., the polymer is substituted with an average of less than 0.01 long chain branch/1000 carbons.

For ethylene/α-olefin interpolymers, "long chain branching" (LCB) means a chain length longer than the short chain branch that results from the incorporation of the α-olefin(s) into the polymer backbone. Each long chain branch has the same comonomer distribution as the polymer backbone and can be as long as the polymer backbone to which it is attached.

The empirical effect of the presence of long chain branching in the 10 substantial linear ethylene/α-olefin interpolymers used in the invention is manifested in its enhanced rheological properties which are quantified and expressed herein in terms of gas extrusion rheometry (GER) results and/or melt flow, $I_{10}/I_2$, increases.

The presence of short chain branching of up to 6 carbon atoms in length can be determined in ethylene polymers by using $^{13}$C nuclear magnetic resonance (NMR) spectroscopy and is quantified using the method described by Randall (Rev. Macromol. Chem. Phys., C.29, V. 2&3, p. 285–297), the disclosure of which is incorporated herein by reference.

As a practical matter, current $^{13}$C nuclear magnetic resonance spectroscopy cannot distinguish the length of a long chain branch in excess of six carbon atoms. However, there are other known techniques useful for determining the presence of long chain branches in ethylene polymers, including ethylene/1-octene interpolymers. Two such methods are gel permeation chromatography coupled with a low angle laser light scattering detector (GPC-LALLS) and gel permeation chromatography coupled with a differential viscometer detector (GPC-DV). The use of these techniques for long chain branch detection and the underlying theories have been well documented in the literature. See, e.g., Zimm, G. H. and Stockmayer, W. H., J. Chem. Phys., 17,1301 (1949) and Rudin, A., *Modern Methods of Polymer Characterization,* John Wiley & Sons, New York (1991) pp. 103–112, both of which are incorporated by reference.

A. Willem deGroot and P. Steve Chum, both of The Dow Chemical Company, at the Oct. 4, 1994 conference of the Federation of Analytical Chemistry and Spectroscopy Society (FACSS) in St. Louis, Mo., presented data demonstrating that GPC-DV is a useful technique for quantifying the presence of long chain branches in SLEPs. In particular, deGroot and Chum found that the level of long chain branches in homogeneous substantially linear homopolymer samples measured using the Zimm-Stockmayer equation correlated well with the level of long chain branches measured using $^{13}$C NMR.

Further, deGroot and Chum found that the presence of octene does not change the hydrodynamic volume of the polyethylene samples in solution and, as such, one can account for the molecular weight increase attributable to octene short chain branches by knowing the mole percent octene in the sample. By deconvoluting the contribution to molecular weight increase attributable to 1-octene short chain branches, deGroot and Chum showed that GPC-DV may be used to quantify the level of long chain branches in substantially linear ethylene/octene copolymers.

deGroot and Chum also showed that a plot of Log ($I_2$) as a function of Log ($M_w$) as determined by GPC illustrates that the long chain branching aspects (but not the extent of long branching) of SLEPs are comparable to that of high pressure, highly branched low density polyethylene (LDPE) and are clearly distinct from ethylene polymers produced using Ziegler-type catalysts such as titanium complexes and ordinary catalysts for making homogeneous polymers such as hafnium and vanadium complexes.

SLEPs are further characterized as having:

(a) a melt flow ratio, $I_{10}/I_2 \geq 5.63$, (b) a molecular weight distribution, $M_w/M_n$ as determined by gel permeation chromatography and defined by the equation:

$$(M_w/M_n) \leq (I_{10}/I_2) - 4.63,$$

(c) a critical shear stress at the onset of gross melt fracture, as determined by gas extrusion rheometry, of greater than $4 \times 10^6$ dynes/cm$^2$ or a gas extrusion rheology such that the critical shear rate at onset of surface melt fracture for the SLEP is at least 50 percent greater than the critical shear rate at the onset of surface melt fracture for a linear ethylene polymer, wherein the SLEP and the linear ethylene polymer comprise the same comonomer or comonomers, the linear ethylene polymer has an $I_2$, $M_w/M_n$ and density which are each within ten percent of the SLEP and wherein the respective critical shear rates of the SLEP and the linear ethylene polymer are measured at the same melt temperature using a gas extrusion rheometer, and (d) a single differential scanning calorimetry, DSC, melting peak between −30 and 150 C.

Generally, the $I_{10}/I_2$ ratio for the linear ethylene polymers is at least about 5.63, preferably at least about 7, especially at least about 8 or above. For the substantially linear ethylene/α-olefin polymers used in the compositions of the invention, the $I_{10}/I_2$ ratio indicates the degree of long chain branching, i.e., the higher the $I_{10}/I_2$ ratio, the more long chain branching in the polymer. Generally, the $I_{10}/I_2$ ratio of the substantially linear ethylene/α-olefin polymers is at least about 5.63, preferably at least about 7, especially at least about 8 or above, and as high as about 25.

The melt index for the substantially linear olefin polymers useful herein is preferably at least about 0.1 grams/10 minutes (g/10 min), more preferably at least about 0.5 g/10 min and especially at least about 1 g/10 min up to preferably about 100 g/10 min, more preferably up to about 50 g/10 min, and especially up to about 20 g/10 min.

Determination of the critical shear rate and critical shear stress in regards to melt fracture as well as other rheology properties such as rheological processing index (PI), is performed using a gas extrusion rheometer (GER). The gas extrusion rheometer is described by M. Shida, R. N. Shroff and L. V. Cancio in *Polymer Engineering Science,* Vol.17, No. 11, p. 770 (1977), and in *Rheometers for Molten Plastics* by John Dealy, published by Van Nostrand Reinhold Co. (1982) on pp. 97–99, both of which are incorporated by reference herein in their entirety. GER experiments are generally performed at a temperature of 190 C., at nitrogen pressures between 250 to 5500 psig using a 0.0754 mm diameter, 20:1 L/D die with an entrance angle of 180°. For the SLEPs described herein, the PI is the apparent viscosity (in kpoise) of a material measured by GER at an apparent shear stress of $2.15 \times 10^6$ dyne/cm$^2$. The SLEPs for use in the invention includes ethylene interpolymers and have a PI in the range of 0.01 kpoise to 50 kpoise, preferably 15 kpoise or less. The SLEPs used herein have a PI less than or equal to 70 percent of the PI of a linear ethylene polymer (either a Ziegler polymerized polymer or a linear uniformly branched polymer as described by Elston in U.S. Pat. No. 3,645,992) having an $I_2$, $M_w/M_n$ and density, each within ten percent of the SLEPs.

The rheological behavior of SLEPs can also be characterized by the Dow Rheology Index (DRI), which expresses a polymer's "normalized relaxation time as the result of long chain branching." (See, S. Lai and G. W. Knight *ANTEC '93 Proceedings,* INSITE™ Technology Polyolefins (SLEP)— New Rules in the Structure/Rheology Relationship of Ethylene α-Oefin Copolymers, New Orleans, La., May 1993, the disclosure of which is incorporated herein by reference). DRI values range from 0 for polymers which do not have any measurable long chain branching (e.g., Tafmer™ products available from Mitsui Petrochemical Industries and Exact™ products available from Exxon Chemical Company) to about 15 and are independent of melt index. In general, for low to medium pressure ethylene polymers (particularly at lower densities) DRI provides improved correlations to melt elasticity and high shear flowability relative to correlations of the same attempted with melt flow ratios. For the SLEPs useful in this invention, DRI is preferably at least 0.1, and especially at least 0.5, and most especially at least 0.8. DRI can be calculated from the equation:

$$DRI = (3652879 * \tau_0^{1.00649} / \eta_0 - 1)/10$$

where $\tau_0$ is the characteristic relaxation time of the material and $\eta_0$ is the zero shear viscosity of the material. Both $\tau_0$ and $\eta_0$ are the "best fit" values to the Cross equation, i.e., $$\eta/\eta_0 = 1/(1+(\gamma \cdot \tau_0)^{1-n})$$

in which n is the power law index of the material, and η and γ are the measured viscosity and shear rate, respectively Baseline determination of viscosity and shear rate data are obtained using a Rheometric Mechanical Spectrometer (RMS-800) under dynamic sweep mode from 0.1 to 100 radians/second at 190 C. and a Gas Extrusion Rheometer (GER) at extrusion pressures from 1,000 psi to 5,000 psi (6.89 to 34.5 MPa), which corresponds to shear stress from 0.086 to 0.43 MPa, using a 0.0754 mm diameter, 20:1 L/D die at 190 C. Specific material determinations can be performed from 140 to 190 C. as required to accommodate melt index variations.

An apparent shear stress versus apparent shear rate plot is used to identify the melt fracture phenomena and quantify the critical shear rate and critical shear stress of ethylene polymers. According to Ramamurthy in the Journal of Rheology, 30(2), 337–357, 1986, the disclosure of which is incorporated herein by reference, above a certain critical flow rate, the observed extrudate irregularities may be broadly classified into two main types: surface melt fracture and gross melt fracture.

Surface melt fracture occurs under apparently steady flow conditions and ranges in detail from loss of specular film gloss to the more severe form of "sharkskin." Herein, as determined using the above-described GER, the onset of surface melt fracture (OSMF) is defined as the loss of extrudate gloss. The loss of extrudate gloss is the point at which the surface roughness of the extrudate can only be detected by a 40× magnification. The critical shear rate at the onset of surface melt fracture for the SLEPs is at least 50 percent greater than the critical shear rate at the onset of surface melt fracture of a linear ethylene polymer having essentially the same $I_2$ and $M_w/M_n$.

Gross melt fracture occurs at unsteady extrusion flow conditions and ranges in detail from regular (alternating rough and smooth, helical, etc.) to random distortions. For commercial acceptability to maximize the performance properties of films, coatings and moldings, surface defects should be minimal, if not absent. The critical shear stress at the onset of gross melt fracture for the SLEPs, especially those having a density >0.91 0 g/cc, used in the invention is greater than $4 \times 10^6$ dynes/cm². The critical shear rate at the onset of surface melt fracture (OSMF) and the onset of gross melt fracture (OGMF) will be used herein based on the changes of surface roughness and configurations of the extrudates extruded by a GER.

The SLEPs used in the invention are also characterized by a single DSC melting peak. The single melting peak is determined using a differential scanning calorimeter standardized with indium and deionized water. The method involves 3–7 mg sample sizes, a "first heat" to about 180 C. which is held for 4 minutes, a cool down at 10 C./min. to −30 C. which is held for 3 minutes, and heat up at 10 C./min. to 140 C. for the "second heat". The single melting peak is taken from the "second heat" heat flow vs. temperature curve. Total heat of fusion of the polymer is calculated from the area under the curve.

For polymers having a density of 0.875 g/cc to 0.910 g/cc, the single melting peak may show, depending on equipment sensitivity, a "shoulder or a "hump" on the low melting side that constitutes less than 12 percent, typically, less than 9 percent, and more typically less than 6 percent of the total heat of fusion of the polymer. Such an artifact is observable for other homogeneously branched polymers such as Exact™ resins and is discerned on the basis of the slope of the single melting peak varying monotonically through the melting region of the artifact. Such an artifact occurs within 34 C., typically within 27 C., and more typically within 20 C. of the melting point of the single melting peak. The heat of fusion attributable to an artifact can be separately determined by specific integration of its associated area under the heat flow vs. temperature curve.

The SLEPs are analyzed by gel permeation chromatography (GPC) on a Waters 150 C. high temperature chromatographic unit equipped with differential refractometer and three columns of mixed porosity. The columns are supplied by Polymer Laboratories and are commonly packed with pore sizes of $10^3$, $10^4$, $10^5$ and $10^6$. The solvent is 1,2,4-trichlorobenzene, from which 0.3 percent by weight solutions of the samples are prepared for injection. The flow rate is 1.0 ml/min, unit operating temperature is 140 C. and the injection size is 100 microliters.

The molecular weight determination with respect to the polymer backbone is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Ward in *Journal of Polymer Science,* Polymer Letters, Vol. 6, p. 621, 1968) to derive the equation $$M_{polyethylene} = a \cdot (M_{polystyrene})^b.$$

In this equation, a=0.4316 and b=1.0. Weight average molecular weight, $M_{w'}$, is calculated in the usual manner according to the formula $$M_w = \Sigma(w_i \times M_i)$$

where $w_i$ and $M_i$ are the weight fraction and molecular weight, respectively, of the $i^{th}$ fraction eluting from the GPC column.

The density of the linear or the substantially linear ethylene polymers (as measured in accordance with ASTM D-792) for use in the present invention is generally less than about 0.95 g/cm³. The density is preferably at least about 0.85 g/cm³ and especially at least about 0.86 g/cm³ and preferably up to about 0.94 g/cm³, more preferably up to about 0.92 g/cm³. When the modified resins are to be used for extrusion and injection molding, the density of the polymer is preferably at least 0.855 g/cm³, more preferably at least 0.865 g/cm and even more preferably at least 0.870 g/cm³, up to preferably 0.900 g/cm³, more preferably 0.885 g/cm³, and even more preferably up to 0.880 g/cm³. The most preferred density is determined primarily by the modulus of elasticity or flexibility desired in the molded article. The density remains substantially constant during rheology modification according to this invention.

The ethylene polymers which may be rheology modified according to this invention may be any interpolymers of ethylene and at least one α-olefin. Suitable α-olefins are represented by the following formula:

in which R is a hydrocarbyl radical. R generally has from one to twenty carbon atoms. Suitable α-olefins for use as comonomers in a solution, gas phase or slurry polymerization process or combinations thereof include 1-propylene, 1-butene, 1-isobutylene, 1-pentene, 1-hexene, 4-methyl-1-pentene, 1-heptene and 1-octene, as well as other monomer types such as tetrafluoroethylene, vinyl benzocyclobutane, and cycloalkenes, e.g. cyclopentene, cyclohexene, cyclooctene, and norbornene (NB). Preferably, the α-olefin will be 1-butene, 1-pentene, 4-methyl-1-pentene, 1-hexene, 1-heptene, 1-octene, or NB, or mixtures thereof. More preferably, the α-olefin will be 1-hexene, 1-heptene, 1-octene, or mixtures thereof. Most preferably, the α-olefin will be 1-octene. The ethylene polymer rheology modified according to this invention is preferably a SLEP.

These interpolymers preferably contain at least about 2 wt %, more preferably at least about 5 wt %, α-olefin.

3. Rheology Modification

The rheology of the above ethylene polymers is modified according to this invention by treating the ethylene polymer with a crosslinking agent in an amount sufficient to increase the molecular weight distribution and/or the melt flow ratio, but less than the amount which would cause more than 0.5 wt % gel formation, under melt processing conditions, as measured via ASTM D2765, Procedure A. Crosslinking agents include peroxide compounds and other known heat-activated curing agents, such as azo compounds, and electron beam, gamma-ray and other known radiation cure systems. If the crosslinking agent is a heat-activated substance, e.g. a peroxide, etc., then this agent is included with the ethylene polymer during melt processing. The various crosslinking agents can be used alone or in combination with one another. Excess or residual peroxide may be available for initiating crosslinking along with another crosslinking agent, e.g. an epoxy, electron beam, etc., to further crosslink the ethylene polymer after thermoforming to make a crosslinked molded article having greater than 0.5 wt % gel up to 100 wt % gel.

Suitable heat-activated crosslinking agents include free radical initiators, preferably organic peroxides, more preferably those with one hour half lives at temperatures greater than 120 C. The free radical initiators can be selected from a variety of known free radical initiators such as peroxides (e.g., VULCUP™ (a series of vulcanizing and polymerization agents containing α,α'-bis(t-butylperoxy)-diisopropylbenzene made by Hercules, Inc.), Di-cup™ (a series of vulcanizing and polymerization agents containing dicumyl peroxide made by Hercules, Inc.), Lupersol™ 130 (2,5-dimethyl-2,5-di(t-butylperoxy)hexyne-3), Lupersol™ 575 (t-amyl peroxy-2-ethylhexonate) (all Lupersol™ peroxides were made by Elf Atochem, North America) or Trigonox™ (an organic peroxide made by Noury Chemical Company)) or radiation treatment (γ, β or α, including electron beam irradiation).

In one embodiment, a heat-activated compound, such as a peroxide-containing compound, may be used as the crosslinking agent. The heat-activated compound is preferably present with the polymer prior to modification in an amount of at least 0.10 equivalents (eq)/1000 carbon atoms, more preferably at least 0.30 eq/1000 carbon atoms, and even more preferably at least 0.50 eq/1000 carbon atoms and preferably up to 1.50 eq/1000 carbon atoms or more, and for some applications more preferably up to 1.00 eq/1000 carbon atoms, wherein "eq" refers to the equivalents of the free radical generating component of the crosslinking agent, such as equivalents of peroxide when the crosslinking agent is a peroxide-containing compound. The crosslinking agent concentration required to modify a particular polymer depends on the susceptibility of the polymer to crosslinking and is influenced by factors such as its percentage vinyl unsaturation and the amount of chain branching, especially short chain branching.

The formulations are compounded by any convenient method, including dry blending the individual components and subsequently melt mixing or melt processing, spraying the heat-activated crosslinking agent onto solid polymer pellets and subsequently melt mixing or melt processing or by pre-melt mixing in a separate device (e.g., a Banbury mixer, a Haake mixer, a Brabender internal mixer, or a single screw or twin screw extruder). Compounding with a twin screw extruder, such as model ZSK- 53 made by Werner and Pfleiderer, is preferred, but other extruder configurations may be used such as those disclosed in U.S. Pat. No. 5,346,963, which is incorporated herein by reference.

The polymer may also be treated with radiation as the crosslinking agent. The amount of energy used to modify the polymer is preferably at least 0.5 Mrad, more preferably at least 2.0 Mrad, and typically up to 50 Mrad. Similar to the case with heat-activated crosslinking agents, the dosage required to modify a particular polymer depends on the susceptibility of the polymer to crosslinking and is influenced by the same factors.

The irradiation conditions are preferably adjusted to avoid unwanted side effects. The irradiation intensity is, for example, preferably adjusted to avoid substantial heating of the polymer, because that might cause the polymer to react with oxygen in the air and dissolved in the polymer, which in turn could cause polymer degradation, resulting in reduction of long-term stability and/or an increased potential to form gels, unless additional measures are taken to prevent contact with oxygen. Excessive heating would also risk fusing discrete polymer particles or pellets together, making it inconvenient to use with conventional melt processing equipment. These side effects may be avoided by adjusting the radiation dosage rate and/or conducting the process in an inert atmosphere. Adjusting the radiation dosage rate is, from a practical standpoint, preferable. The radiation dosage rate is preferably less than 20 Mrad/s, more preferably less than 10 Mrad/s, and even more preferably less than 7 Mrads/s.

The crosslinking agent treatment may be carried out online. Online crosslinking agent treatment is carried out on the polymer as the polymer is produced, preferably immediately after polymerization and devolatilization and prior to first solidification of the polymer (typically by pelletization). When the crosslinking agent is a heat-activated compound, the compound may be added with a solvent or as a concentrate in a masterbatch. Multiple reactor polymerization processes, operated in series or in parallel, such as described in U.S. Pat. No. 3,914,342 (which is incorporated herein by reference) may be used to combine a rheology modified polymer made according to this invention with one or more additional polymers. The additional polymers may be rheology modified or unmodified. They may be selected from any of the polymers described above that serve as starting materials for rheology-modification according to this invention or they may be other polymers including heterogeneous polymers such as low density polyethylene (LDPE), linear low density polyethylene polymers (LLDPE), high density ethylene polymers (HDPE), and polymers grafted or copolymerized with various functional groups.

Rheology modification may also be carried out offline. Offline modification may be carried out by treating an unmodified polymer with crosslinking agent after it has been solidified (typically as pellets or granules). When the crosslinking agent is radiating energy, the polymer may be treated by exposing the polymer, preferably as a solid, to the radiating energy under conditions which allow for control of the amount of energy absorbed by the polymer. When the crosslinking agent is a heat-activated compound as described above, it is either admixed with or coated on the polymer pellets or granules and then the polymer pellets or granules are melt processed or it is added to the polymer, directly or preferably in the form of a concentrate or masterbatch, during melt processing such as through one of the ports for adding components to the melt often provided on melt processing equipment.

The present invention also encompasses intermediates for making rheology modified polymers according to this invention. Such intermediates include the radiation or heat-activated compound crosslinked pellets and granules described above which may be melt processed into the finished article alone or in combination with the other polymers described above and they may also be pellets that have been sprayed, coated in some other way, or admixed with a heat-activated crosslinking agent, such as a peroxide compound or azo compound. The heat-activated compound may be applied neat, with an adjuvant or with a substance that retards the reactivity of the heat-activated compound at temperatures below the intended melt processing temperature. The pellets or granules treated with the heat-activated compound may be further treated to seal the heat-activated compound onto the surface of the pellets or granules, if necessary.

Rheology modification may be carried out using polymer that contains little or no secondary antioxidant. This may be preferred in cases in which the polymer will undergo further processing in which the manufacturer customizes the polymer with its own additive package which includes one or more antioxidants. This may in some instances also be preferred from a cost and polymer color standpoint, since some antioxidants may react with the crosslinking agent, using up some of the antioxidant intended to protect the polymer against oxidation and possibly forming colored byproducts.

The polymer is treated with crosslinking agent in the amount required to cause modification of the shear viscosity, relaxation time and/or melt strength of the polymer in accordance with the conditions specified above in equations (I) to (VII).

In one embodiment, the modification of the shear viscosity results in a log viscosity ratio (i.e., $(\log \eta_{0.1} - \log \eta_{100})/\log \eta_{100}$) of at least 0.30 (i.e., Z=0.30). Preferably, the modified polymer has a Z equal to 0.32, more preferably 0.34, more preferably 0.38, and even more preferably 0.40.

In another embodiment, the rheology-modified polymer has a $\log \tau_0$ (log relaxation time) at $\log \eta_0 = 0$ (i.e., zero shear viscosity of 1 poise), b, of less than or equal to 5.950, preferably less than or equal to 5.900, and more preferably less than or equal to 5.800, and/or a $\Delta \log \tau_0 / \Delta \log \eta_0$, m, of greater than or equal to 1.070, preferably greater than or equal to 1.080, and more preferably greater than or equal to 1.090.

In yet another embodiment, the rheology-modified polymer has a melt strength improvement constant, K, of 0.50 cN, preferably 1.00 cN, more preferably 2.00 cN, even more preferably 3.00 cN, and even more preferably 4.00 cN. When the modified resins are to be used for extrusion and injection molding, the melt strength is preferably at least 0.2 cN, more preferably at least 0.5 cN, and even more preferably at least 1.0 cN, up to preferably 50 cN, more preferably up to 30 cN, and even more preferably upto20cN at 150 C.

In a preferred embodiment of this invention, the rheology-modified polymer satisfies at least two of equations (I), (II) and (III). In a more preferred embodiment of this invention, the rheology-modified polymer satisfies all three of equations (I), (II) an (III).

In one embodiment, the process of this invention modifies the polymer such that the modification results in an x value of 0.5, preferably 0.7 and more preferably 0.8, and a γ value of 0.10, preferably 0.01 and more preferably 0.005.

In another embodiment of the process of this invention, the log relaxation time ($\log \tau_0$) is increased by at least 0.1 units, preferably by at least 0.2 units, and more preferably by 0.3 units up to 6.0 units or higher, preferably up to 5.0 units and more preferably up to 4.0 units and in some cases even more preferably up to 3.0 units.

In another embodiment of this invention, the process of this invention improves melt strength of the polymer by 0.5 cN, preferably by 2.0 cN and more preferably by 4.0 cN.

In a preferred embodiment of this invention, the process satisfies the conditions defined by equations (IV), (V) and (VI); (IV), (V) and (VII); or (VI) and (VII). In a more preferred embodiment of this invention, the process satisfies all of equations (IV) to (VII).

In yet another embodiment of this invention, the melt strength of the polymer is increased by 20 percent, more preferably 40 percent and even more preferably 60 percent.

Melt strength is determined by measuring the maximum tensile force on a molten filament of a polymer melt extruded from a capillary rheometer die at a constant shear rate of 33 sec$^{-1}$ when that filament is being stretched at an acceleration of 0.24 cm/s$^2$, starting at an intitial velocity of 1 cm/s, by a pair of nip rollers located 10 cm below the the capillary die, the tensile force being measured at the nip rollers.

The molten filament for the above test is preferably generated by heating 10 grams of the polymer packed in the barrel of an Instron capillary rheometer having a capillary die with a 0.21 diameter, 4.19 cm length (L/D=19.95) to a temperature sufficient to melt the polymer and obtain a melt strength value in the range from 1 to 15 cN (determined through the technique described below), equilibrating the polymer at that temperature for 5 minutes, and then extruding the polymer from the rheometer using a piston speed of 2.54 cm/min. The tensile force is preferably measured using a Goettfert Rheotens located so that the nip of its nip rollers are 10 cm directly below the point at which the filament exits the capillary die. The nip rollers uniaxially stretch the molten polymer filament at the speed and acceleration specified above, while the tensile force on the spinline of the nip rollers is simultaneously and continuously measured. The tensile force values are not corrected for swell effects or for the weight of the extrudate hanging from the nip rollers.

As mentioned above, the temperature of the polymer in the capillary rheometer is adjusted to a temperature which generates a melt strength value in the range from 1 to 15 cN ($MS^{Ta}$). That value may then be adjusted to the melt strength at another specified temperature ($MS^{Tb}$) through the equation:

$$MS^{Tb} = \exp\left[\ln MS^{Ta} + \frac{E_{act}}{R}\left(\frac{1}{T_b} - \frac{1}{T_a}\right)\right]$$

which is based on the well-known Arrhenius equation wherein $T_a$ and $T_b$ are the actual and target temperatures of the polymer being extruded by the capillary rheometer, respectively, in degrees Kelvin; $MS^{Ta}$ and $MS^{Tb}$ are the actual and predicted melt strengths of the polymer at temperatures $T_a$ and $T_b$, respectively; $E_{act}$ is the polymer's activation energy and R is the gas constant, 1.987 calories/mole °K. The activation energy is 11,120 calories for any of the homogeneous polymers used in this invention, even after rheology modification.

When the melt strength at 150 C. ($MS^{150C}$) is desired, such as for equations (III) and (VII) above, then $T_b$ is 423.15° K.

The temperature $T_a$ can vary over a wide range, but is generally in the range from 353° K. to 513° K. (80 C. to 240 C.).

When the initial measured $MS^{Ta}$ falls outside the 1 to 15 cN range, the following equation may be used to adjust the polymer melt temperature to obtain a measurement within the 1 to 15 cN range:

$$T_b = 1/[(R/E_{act})(\ln MS^{Tb} - \ln MS^{Ta}) + 1/T_a]$$

More than one iteration of melt strength measurement and polymer melt temperature adjustment may be needed to arrive at a temperature $T_b$ in which $MS^{Ta}$ falls in the 1 to 15 cN range due to the potential for error when operating the specified equipment outside this range. One skilled in this art is generally familiar with this measurement and knows how to make the appropriate adjustments to obtain reliable melt strength measurements.

The preferred rheology-modified polymers made according to this invention also have an improved DRI. The DRI of these polymers is preferably at least 1.0 units, more preferably at least 5.0 units and even more preferably at least 10.0 units. The DRI of the polymer rheology-modified according to this invention is improved over that of the polymer prior to rheology modification by preferably at least 0.5 units, more preferably by at least 2.0 units, and even more preferably by at least 8.0 units.

The molecular weight distribution of the modified polymer is less than 4.0, preferably less than 3.5, more preferably less than 3.3. The molecular weight distribution of the modified polymer is preferably greater than that of the polymer prior to modification by at least 10 percent, more preferably by at least 20 percent, and even more preferably by at least 50 percent.

Preferably, the rheology-modified polymer has a $M_w$ greater than about 30,000, and more preferably greater than about 40,000.

The melt flow ratio of the modified polymer is preferably at least 7.0, more prefarably at least 10.0, and even more preferably at least 14.0. The melt flow ratio of the modified polymer is preferably greater than that of the polymer prior to modification by at least 10 percent, more preferably at least 50 percent, and even more preferably at least 100 percent.

The melt index of the rheology-modified polymer is preferably less than 50 g/10 min., more preferably less than 15 g/10 min., even more preferably less than 12 g/10 min., and even more preferably less than 6 dg/min., and preferably, for practical reasons, greater than 0.1 g/10 min. When the modified resins are to be used for extrusion and injection molding, the melt index of the modified polymer is preferably at least 0.5 g/10 min., more preferably at least 5 g/10 min., and even more preferably at least 8 g/10 min. The most preferred melt index of the modified polymer is determined by balancing processability (melt strength and melt fracture) without producing more than 0.5 wt % gel.

Preferably, modification of the polymer results in less than 0.3 percent gel formation under melt processing conditions, more preferably less than 0.1 percent gel, and even more preferably no measurable gel formation.

The preferred rheology-modified polymers according to this invention are also substantially free of gel defects. Gel defects are caused by thermo-oxidative crosslinking which gives rise to the formation of small globular masses of polymer which have not blended completely with the surrounding polymer due primarily to the viscosity differential between the globular mass and the surrounding polymer. Because they generally comprise only a small proportion of the bulk polymer, they are difficult to quantify using a test such as ASTM D2765, Procedure A. That is why gel defects are generally measured manually (if in a piece of sheet or film) or with an instrument such as a laser gel counter. In one manual method of measuring gel defects, a film sample of fixed dimensions is placed over a light box and the number of visible gel defects per unit area is counted. An example of a laser gel counter is the Intec Laser Gel Counter, Model 5000, manufactured by Intec, Inc. Using a laser gel counter, it is possible to count the number of gel defects and to classify the gel defects by size. The rheology-modified polymers according to this invention preferably have less than 200, more preferably less than 100, gel defects greater than 0.03 inches in nominal diameter per 10,000 inches .

Rheology modification of polymers according to this invention may also be used to reduce the potential for onset of melt fracture. Reducing the potential for gross melt fracture and surface melt fracture is often substantially improved relative to the values obtained with the same polymer prior to modification.

The amount of crosslinking agent required to satisfy one or more of these conditions for a specific polymer varies depending primarily on the specific end use of the modified polymer and the susceptibility of the polymer to crosslinking. The susceptibility of the polymer to crosslinking is in part affected by the amount of vinyl unsaturation/1000 carbon atoms and the amount of short chain branching/1000 carbon atoms.

The amount of vinyl unsaturation can be quantified by infrared (IR) spectroscopy according to the method described in Dole, *Polym. Plast. Technol. Engineering,* Vol 13, p.41 (1971) using the equation:

$$\text{vinyls/1000 carbon atoms} = \text{IR absorbancy at 909 cm}^{-1}/(0.970 \times t)$$

wherein t is the thickness of the polymer film in millimeters (see also Chum, *J. Plastic Film & Sheeting,* Vol. 8, pp. 37–47 (1992)). In a preferred embodiment, the polymer prior to modification has a vinyl unsaturation less than 0.30/1000 carbon atoms, more preferably less than 0.10/1000 carbon atoms.

The amount of short chain branching/1000 carbon atoms due to comonomer incorporation may generally be inversely correlated with the density of the polymer, the short chain branching/1000 carbon atoms generally increasing with decreasing density.

Given this disclosure of the invention, matching the appropriate dosage of crosslinking agent to the polymer to be modified is a matter of routine experimentation within the ambit of one of ordinary skill.

There are many types of molding operations which can be used to form useful fabricated articles or parts from the formulations disclosed herein, including various injection molding processes (e.g., that described in *Modern Plastics Encyclopedia*/89, Mid October 1988 Issue, Volume 65, Number 11, pp. 264–268, "Introduction to Injection Molding" and on pp. 270–271, "Injection Molding Thermoplastics", the disclosures of which are incorporated herein by reference) and blow molding processes (e.g., that described in *Modern Plastics Encyclopedia*/89, Mid October 1988 Issue, Volume 65, Number 11, pp. 217–218, "Extrusion-Blow Molding", the disclosure of which is incorporated herein by reference), profile extrusion, calandering, pultrusion and the like.

The rheology-modified ethylene polymers, processes for making them, and intermediates for making them of this invention are useful in the automotive area, industrial goods, building and construction, electrical (e.g., wire and cable coatings/insulation) and tire products. Some of the fabricated articles include automotive hoses, single ply roofing, and wire and cable voltage insulation and jackets.

Film and film structures particularly benefit from this invention and can be made using conventional hot blown film fabrication techniques or other biaxial orientation processes such as tenter frames or double bubble processes. Conventional hot blown film processes are described, for example, in *The Encyclopedia of Chemical Technology,* Kirk-Othmer, Third Edition, John Wiley & Sons, New York, 1981, vol.16, pp. 416–417 and Vol. 18, pp. 191–192. Biaxial orientation film manufacturing process such as described in a "double bubble" process as in U.S. Pat. No. 3,456,044 (Pahlke), and the processes described in U.S. Pat. No. 4,352,849 (Mueller), U.S. Pat. No. 4,597,920 (Golike), U.S. Pat. No. 4,820,557 (Warren), U.S. Pat. No. 4,837,084 (Warren), U.S. Pat. No. 4,865,902 (Golike et al.), U.S. Pat. No. 4,927,708 (Herran et al.), U.S. Pat. No. 4,952,451 (Mueller), U.S. Pat. No. 4,963,419 (Lustig et al.), and U.S. Pat. No. 5,059,481 (Lustig et al.), can also be used to make film structures from the novel compostions described herein. The film structures can also be made as described in a tenter-frame technique, such as that used for oriented polypropylene.

Other multi-layer film manufacturing techniques for food packaging applications are described in *Packaging Foods With Plastics,* by Wilmer A. Jenkins and James P. Harrington (1991), pp. 19–27, and in "Coextrusion Basics" by Thomas I. Butler, *Film Extrusion Manual: Process, Materials, Properties* pp. 31–80 (published by the TAPPI Press (1992)).

The films may be monolayer or multilayer films. The film made using this invention can also be coextruded with the other layer(s) or the film can be laminated onto another layer(s) in a secondary operation, such as that described in *Packaging Foods With Plastics,* by Wilmer A. Jenkins and James P. Harrington (1991) or that described in "Coextrusion For Barrier Packaging" by W. J. Schrenk and C. R. Finch, *Society of Plastics Engineers RETEC Proceedings,* June 15–17 (1981), pp. 211–229. If a monolayer film is produced via tubular film (i.e., blown film techniques) or flat die (i.e., cast film) as described by K. R. Osborn and W. A. Jenkins in "Plastic Films, Technology and Packaging Applications" (Technomic Publishing Co., Inc., 1992), the disclosure of which is incorporated herein by reference, then the film must go through an additional post-extrusion step of adhesive or extrusion lamination to other packaging material layers to form a multilayer structure. If the film is a coextrusion of two or more layers (also described by Osborn and Jenkins), the film may still be laminated to additional layers of packaging materials, depending on the s other physical requirements of the final film. "Laminations vs. Coextrusion" by D. Dumbleton (Converting Magazine (September 1992), also discusses lamination versus coextrusion. Monolayer and coextruded films can also go through other post extrusion techniques, such as a biaxial orientation process.

Extrusion coating is yet another technique for producing multilayer film structures using the novel compositions described herein. The novel compositons comprise at least one layer of the film structure. Similar to cast film, extrusion coating is a flat die technique. A sealant can be extrusion coated onto a substrate either in the form of a monolayer or a coextruded extrudate.

Generally for a multilayer film structure, the novel compositions described herein comprise at least one layer of the total multilayer film structure. Other layers of the multilayer structure include but are not limited to barrier layers, and/or tie layers, and/or structural layers. Various materials can be used for these layers, with some of them being used as more than one layer in the same film structure. Some of these materials include: foil, nylon, ethylene/vinyl alcohol (EVOH) copolymers, polyvinylidene chloride (PVDC), polyethylene terethphalate (PET), oriented polypropylene (OPP), ethylene/vinyl acetate (EVA) copolymers, ethylene/acrylic acid (EAA) copolymers, ethylene/methacrylic acid (EMAA) copolymers, LLDPE, HDPE, LDPE, nylon, graft adhesive polymers (e.g., maleic anhydride grafted polyethylene), and paper. Generally, the multilayer film structures comprise from 2 to 7 layers.

Such articles comprising the rheology-modified polymer of this invention may be made by melt processing the rheology-modified polymer according to this invention. That process may include processing pellets or granules of polymer which have been rheology-modified according to this invention. In a preferred embodiment, the pellets or granules are substantially free of unreacted crosslinking agent when the crosslinking agent comprises a heat-activated crosslinking agent.

Such articles may also be made by melt processing an intermediate comprising a homogeneous polymer which is not substantially free of unreacted crosslinking agent. Such intermediates are preferably treated with a crosslinking agent, but are not subjected to subsequent melt processing until the polymer is melted to make the article. The crosslinking agent may be either radiation or a heat-activated crosslinking agent.

The rheology-modified polymers and intermediates used to make rheology-modified polymers may be used alone or in combination with one or more additional polymers in a polymer blend. When additional polymers are present, they may be selected from any of the modified or unmodified homogeneous polymers described above for this invention and/or any modified or unmodifed heterogeneous polymers.

The heterogeneous polyethylenes that may be combined with the rheology-modified polymers according to this invention fall into two broad categories, those prepared with a free radical initiator at high temperature and high pressure, and those prepared with a coordination catalyst at high temperature and relatively low pressure. The former are generally known as low density polyethylenes (LDPE) and are characterized by branched chains of polymerized monomer units pendant from the polymer backbone. LDPE polymers generally have a density between about 0.910 and 0.935 g/cc. Ethylene polymers and copolymers prepared by the use of a coordination catalyst, such as a Ziegler or Phillips catalyst, are generally known as linear polymers because of the substantial absence of branch chains of polymerized monomer units pendant from the backbone. High density polyethylene (HDPE), generally having a density of about 0.941 to about 0.965 g/cc, is typically a homopolymer of ethylene, and it contains relatively few branch chains relative to the various linear copolymers of ethylene and an α-olefin. HDPE is well known, commercially available in various grades, and may be used in this invention.

Linear copolymers of ethylene and at least one α-olefin of 3 to 12 carbon atoms, preferably of 4 to 8 carbon atoms, are also well known and commercially available. As is well known in the art, the density of a linear ethylene/α-olefin copolymer is a function of both the length of the α-olefin and the amount of such monomer in the copolymer relative to the amount of ethylene, the greater the length of the α-olefin and the greater the amount of α-olefin present, the lower the density of the copolymer. Linear low density polyethylene (LLDPE) is typically a copolymer of ethylene and an α-olefin of 3 to 12 carbon atoms, preferably 4 to 8 carbon atoms (e.g., 1-butene, 1-octene, etc.), that has sufficient α-olefin content to reduce the density of the copolymer to that of LDPE. When the copolymer contains even more α-olefin, the density will drop below about 0.91 g/cc and these copolymers are known as ultra low density polyethylene (ULDPE) or very low density polyethylene (VLDPE). The densities of these linear polymers generally range from about 0.87 to 0.91 g/cc.

Both the materials made by the free radical catalysts and by the coordination catalysts are well known in the art, as are their methods of preparation. Heterogeneous linear ethylene polymers are available from The Dow Chemical Company as Dowlex™ LLDPE and as Attane™ ULDPE resins. Heterogeneous linear ethylene polymers can be prepared via the solution, slurry or gas phase polymerization of ethylene and one or more optional α-olefin comonomers in the presence of a Ziegler Natta catalyst, by processes such as are disclosed in U.S. Pat. No. No. 4,076,698 to Anderson et al., which is incorporated herein by reference. Preferably, heterogeneous ethylene polymers are typically characterized as having molecular weight distributions, $M_w/M_n$, in the range of from 3.5 to 4.1. Relevant discussions of both of these classes of materials, and their methods of preparation are found in U.S. Pat. No. No. 4,950,541 and the patents to which it refers, all of which are incorporated herein by reference.

The polymer mixture of this invention may further include recycled and scrap materials and diluent polymers (both encompassed by the expression "diluent materials"), to the extent that the desired performance properties are maintained. Exemplary diluent materials include, for example, elastomers, rubbers and anhydride modified polyethylenes (e.g., polybutylene and maleic anhydride grafted LLDPE and HDPE) as well as with high pressure polyethylenes such as, for example, low density polyethylene (LDPE), EAA interpolymers, ethylene/vinyl acetate (EVA) interpolymers and ethylene/methacrylate (EMA) interpolymers, and combinations thereof. In some instances, it is preferable for the polymer mixture of this invention to contain less than 50 wt %, more preferably less than 30 wt % and even more preferably less than 10 wt %, diluent material, particularly when the diluent material is a styrene copolymer, more particularly when the diluent material is a styrene/butadiene rubber and even more particularly when the diluent material is a styrene/butadiene/styrene block copolymer (SBS).

The weight ratio of rheology-modified polymer according to this invention to one or more unmodifed homogeneous polymers, heterogeneous polymers, recycled and scrap materials, and diluent polymers described above may range from 1:99 to 99:1. In one embodiment, the weight ratio is in the range from 10:90 to 90:10. In a further embodiment, the weight ratio is in the range from 30:70 to 70:30.

Additives, such as antioxidants (e.g., hindered phenolics, such as lrganox™ 1010 or Irganox™ 1076 supplied by Ciba Geigy and phosphates (e.g., Irgafos™ 168 also supplied by Ciba Geigy, Sandostab PEPQ™ supplied by Sandoz)), cling additives (e.g., PIB), tackifiers, plasticizers, oils, peroxides (such as for wire and cable coating applications), pigments, colorants, fillers, and the like may also be included in the polymer compositions and articles comprising a rheology-modified polymer according to the present invention. Although generally not required, films, coatings and moldings formed from the polymer mixture of the present invention may also contain additives to enhance antiblocking, mold release and coefficient of friction characteristics including, but not limited to, untreated and treated silicon dioxide, talc, calcium carbonate, and clay, as well as primary, secondary and substituted fatty acid amides, release agents, silicone coatings, etc. Still other additives, such as quaternary ammonium compounds alone or in combination with ethylene-acrylic acid (EAA) copolymers or other functional polymers, may also be added to enhance the antistatic characteristics of films, coatings and moldings formed from the polymer mixture of the invention and permit the use of these polymer mixtures in, for example, the heavy-duty packaging of electronically sensitive goods.

The following examples are illustrative of certain specific embodiments of this invention.

4. Experimental

The polymers identified in Table 1 are melt processed and tested for change in melt index and change in low and high shear viscosity. In addition, these polymers are treated with peroxide as the crosslinking agent (and in the case of Samples 1, 4 and 5 also treated with radiant energy as the crosslinking agent).

TABLE 1

| Sample | Polymer | Percent Comonomer | $I_2$ (g/10 min) | Density (g/cm$^3$) | $I_{10}/I_2$ | $M_w/M_n$ |
|---|---|---|---|---|---|---|
| 1 | SLEP | 12.5 | 16.30 | 0.8828 | 7.08 | 2.00 |
| 2 | SLEP | 23.5 | 14.70 | 0.8731 | 7.39 | 2.04 |
| 3 | SLEP | 22.5 | 4.90 | 0.8736 | 7.38 | 1.99 |
| 4 | SLEP | 25.0 | 0.90 | 0.8694 | 6.88 | 1.91 |
| 5 | SLEP | 23.5 | 0.47 | 0.8709 | 7.57 | 2.00 |
| 6 | SLEP | 12.5 | 0.80 | 0.9015 | 8.60 | 2.04 |
| 7 | Exact ™ 3028 | NM | 1.09 | 0.9026 | 5.57 | NM |
| 8 | Tafmer ™ A 4085 | NM | 3.60 | 0.8800 | NM | NM |
| 9* | Attane ™ 4403 | 13.5 | 0.76 | 0.9035 | 9.09 | 3.88 |

*Comparison example only; not an example of the invention
Exact ™ is a trademark of and made by Exxon Chemical
Tafmer ™ is a trademark of and made by Mitsui Petrochemical
Attane ™ is a trademark of and made by The Dow Chemical Company The SLEP's are all ethylene/1-octene copolymers produced using Dow lnsite™ Technology. The Exact™ 3028 resin is a linear homogeneously branched ethylene/butene copolymer resin (6.6 mol% butene) and has an antioxidant package comprising 170 ppm Irganox 1076™ and 378 ppm trisnonylphenyl phosphite, while the Tafmer™ A 4085 is a linear homogeneously branched ethylene copolymer resin. The Attane™ 4403 is a ultra-low density heterogeneously branched linear ethylene-1-octene copolymer which has not only an antioxidant package comprising 200 ppm Irganox 1010™, but also has 2000 ppm of PEPQ added. All of the SLEP resins have an antioxidant package comprising 500 ppm Irganox 1076™ and 800 ppm PEPQ.

Example A: Melt Processed Examples

Samples 2–4, 6 and 9* are measured for melt index and viscosity at low and high shear rate and then reextruded on a Werner and Pfleiderer ZSK-53 twin screw extruder. After reextrusion, the samples are again tested for melt index and viscosity at low and high shear. Viscosity is determined using a dynamic mechanical spectrometer, the Rheometrics RMS-800 equipped with 25 mm diameter parallel plates in the oscillatory shear mode. Frequency sweeps are performed over the shear range of 0.1 to 100 radians/second at 15% strain at 190 C. in a nitrogen atmosphere. High shear rate data is measured on a constant stress gas extrusion rheometer (GER) in the shear rate range of about 10–1000 sec$^{-1}$. The GER is the same as described above. The results are showrt below in Table 2:

TABLE 2

| Sample | Melt Processed | Final I$_2$ (g/10 min) | Viscosity at 0.1 rad/sec (poise) | Viscosity at 100 rad/sec (poise) |
|---|---|---|---|---|
| 2 | no | 14.4 | 5740 | 3440 |
| 2 | yes | 14.0 | 5860 | 3510 |
| 4 | no | 0.90 | 96900 | 18800 |
| 4 | yes | 0.95 | 92300 | 18100 |
| 6 | no | 0.80 | 132000 | 17300 |
| 6 | yes | 0.89 | 122000 | 15820 |
| 9* | no | 0.76 | 105000 | 17400 |
| 9* | yes | 0.55 | 134000 | 17300 |

*Comparison example only; not an example of the invention

As the data in Table 2 show, the homogeneously branched SLEP resins, after melt processing, have lower or equivalent viscosity at low shear (0.1 rad/sec) after reextruding than as virgin polymer, while the heterogeneously branched polyethylene has higher viscosity at low shear, indicating that the heterogeneously branched polyethylene has significantly changed structure during the reextrusion resulting in more difficult processability at low shear. These effects are particularly pronounced when comparing sample 6 and 9* (having similar melt index and density as virgin ("non-melt processed") polymers).

Examples 1–3: Radiation Modification

Example 1: Effect of γ-irradiation on the properties of Sample 1

Table 3 shows data on the properties of Sample 1 before and after irradiation using γ particles.

TABLE 3

| Physical Property | Sample 1 | Sample 1a | Sample 1b | Sample 1c |
|---|---|---|---|---|
| Mrads | 0 | 3 | 6 | 10.5 |
| I$_2$(g/10 min) | 16.3 | 9.19 | 2.48 | 0.35 |
| I$_{10}$/I$_2$ | 7.08 | 9.01 | 11.34 | 17.37 |
| Density (g/cc) | 0.8828 | 0.8821 | 0.8814 | 0.8820 |
| M$_w$ | 54300 | 62900 | 92000 | 117600 |
| M$_n$ | 27300 | 28100 | 29900 | 27900 |
| M$_w$/M$_n$ | 1.989 | 2.238 | 3.076 | 4.215 |
| η(0.1 Hz) | 6030 | 11800 | 57500 | 165000 |
| η(100 Hz) | 3460 | 3670 | 5340 | 6470 |
| Log η ratio | 0.07 | 0.14 | 0.28 | 0.37 |
| ΔLog η(0.1 Hz) | NA | 0.29 | 0.98 | 1.44 |
| ΔLog η(100 Hz) | NA | 0.03 | 0.19 | 0.27 |
| DRI | 0.20 | 0.69 | 7.73 | 43.4 |
| MS$^{150}$ (cN) | 0.75 | 2.40 | 14.00 | NM |
| MS Improvement | NA | 0.35 | 5.77 | NM |
| Hardness(Shore A) | 81.4 | 79.4 | 80.2 | 81.0 |
| Tensile Break(psi) | 1000 | 1112 | 1283 | 1179 |
| Strain at Break(%) | 1164 | 1147 | 1117 | 1099 |

Log η ratio = (log η$_{0.1}$ − log η$_{100}$)/log η$_{100}$
ΔLog η(0.1 Hz) = log η$_{0.1}^m$ − log η$_{0.1}^v$
ΔLog η(100 Hz) = log η$_{100}^m$ − log η$_{100}^v$
MS Improvement = MS$^{150C}$ − 72.079(log M$_w$)$^2$ + 666.28(log M$_w$) − 1539.5
"NA" means "not applicable"

Example 2: Effect of electron beam irradiation on low and high shear rate viscosity of Sample 4

Table 4 describes the melt index change and low and high shear viscosity change before and after electron beam irradiation (at 0 and 2.5 Mrad dosages) of Sample 4. The samples were in the form of solid polymer 1/8 inch diameter nominally spherical pellets which were moved through the electron beam on 60 inch by 50 inch carts. The carts were loaded with 25 pounds of pellets for each run. The electron beam output was set at 34 milliamperes, 4.5 MeV and 86% scan.

TABLE 4

| Physical Property | Sample 4 | Sample 4a |
|---|---|---|
| Mrads | 0.00 | 2.50 |
| η(0.1 Hz) Poise | 96850 | 942000 |
| η(100 Hz) Poise | 18820 | 16740 |
| Log η ratio | 0.17 | 0.41 |
| ΔLog η(0.1 Hz) | NA | 1.0 |
| ΔLog η(100 Hz) | NA | −0.04 |

Log η ratio = (log η0.1 − log η$_{100}$)/log η100
ΔLog η(0.1 Hz) = log η$_{0.1}^m$ − log η$_{0.1}^v$
ΔLog η(100 Hz) = log η$_{100}^m$ − log $f_{100}^v$
"NA" means "not applicable"

Example 3

Table 5 describes the melt index change and low and high shear viscosity change before and after electron beam irradiation (at 0.75 and 1.0 Mrad dosages) of Sample 5. As in Example 2 the samples were in the form of solid polymer 1/8 inch diameter nominally spherical pellets which were moved through the electron beam on 60 inch by 50 inch carts at 25 pounds of pellets per run. The electron beam output and scan were the same as in Example 2.

A dosage of 0.75 Mrad was accomplished by moving the cart through the beam at 49 feet per minute (FPM), a dosage of 1.0 Mrad was accomplished by moving the cart through the same beam at the rate of 46 FPM.

TABLE 5

| Physical Property | Sample 5 | Sample 5a | Sample 5b |
|---|---|---|---|
| Mrads | 0.00 | 0.75 | 1.00 |
| η(0.1 Hz) Poise | 187,200 | 376,800 | 507,700 |
| η(100 Hz) Poise | 24,540 | 22,360 | 23,400 |
| Log η ratio | 0.20 | 0.28 | 0.31 |
| ΔLog η(0.1 Hz) | NA | 0.30 | 0.43 |
| ΔLog η(100 Hz) | NA | −0.04 | −0.02 |

Log η ratio = (log η0.1 − log η$_{100}$)/log η100
ΔLog η(0.1 Hz) = log η$_{0.1}^m$ − log η$_{0.1}^v$
ΔLog η(100 Hz) = log η$_{100}^m$ − log $f_{100}^v$
"NA" means "not applicable"

Examples 4–15: Peroxide Modification

The peroxide modification is accomplished using a Werner and Pfleiderer ZSK-53 twin-screw extruder which is a co-rotating fully intermeshing extruder that uses three-lobed screw elements and is capable of screw speeds of up to 450 revolutions per minute (rpm). The extruder has a feed section of 4.0 diameters (212 mm) and four additional barrel sections with a length of 7.5 diameters (400 mm) each. The ZSK-53 extruder is equipped with a diverter valve, gear pump, screen changer and underwater pelletizer. Maximum production for this system is 300 lbs/hour. Production rate for the samples described herein is 100 lbs/hour.

Examples 4–15 are peroxide modified using the ZSK-53 twin screw extruder. For Examples 4–14, the peroxide is Lupersol 130 and for Example 15, the peroxide is Lupersol 575. A solution of the selected peroxide is mixed with methyl ethyl ketone (supplied by Southwest Solvents and Chemicals) at various weight ratios to allow a target flow rate of 4 lbs/hour for all samples and fed to the extruder with a diaphragm metering pump (Pulsa Feeder model no. 7120-S-E). This pump has a maximum capacity of 25 lbs/hour at 1500 psig back pressure. The solution is fed from 1.5 gallon stainless steel feed tanks, each padded with 5–10 psig nitrogen. The solution is pumped from the feed tanks through a micromotion flow meter (Model 6) calibrated at 0–15 lbs/hour. The solution is fed to the extruder through a stainless steel injector purchased from Werner and Pfleiderer, which is capable of providing adjustable back pressures of 0–3000 psi. Operating pressure is 600–1200 psi. Solvent and peroxide by-products are removed by a devolatilization system consisting of two stainless steel knock-out vessels cooled by methylene chloride to a temperature of −40C. to −50C. The vacuum pump used is a Beach Russ high vacuum rotary pump that uses a once-through oil system to create the seal. The vacuum system is capable of 16 to 29 inches of mercury absolute vacuum.

Example 4: Effect of Peroxide Addition on the Properties of Sample 2

Table 6 shows data on the properties of Sample 2 before and after peroxide treatment.

TABLE 6

| Physical Property | Sample 2* | Sample 2A | Sample 2B | Sample 2C | Sample 2D |
|---|---|---|---|---|---|
| Wt % Lupersol ™ 130 | 0.000 | 0.099 | 0.302 | 0.573 | 1.030 |
| Eqs. ROOR/1000C | 0.000 | 0.097 | 0.296 | 0.561 | 1.010 |
| $I_2$ (g/10 min) | 15.91 | 12.58 | 8.01 | 3.18 | 0.57 |
| $I_{10}/I_2$ | 7.39 | 7.79 | 9.15 | 11.77 | 12.96 |
| Density (g/cc) | 0.8733 | 0.8732 | 0.8729 | 0.8730 | 0.8731 |
| Mw | 59700 | 62900 | 71400 | 93100 | 131600 |
| Mn | 29200 | 30600 | 29400 | 30900 | 30400 |
| Mw/Mn | 2.04 | 2.06 | 2.43 | 3.01 | 4.33 |
| η(0.1 Hz) Poise | 5740 | 7410 | 14600 | 52770 | 154000 |
| η(100 Hz) Poise | 3440 | 3640 | 4090 | 5114 | 6430 |
| Log η ratio | 0.063 | 0.087 | 0.153 | 0.273 | 0.362 |
| ΔLog η(0.1 Hz) | NA | 0.11 | 0.40 | 0.96 | 1.43 |
| ΔLog η(100 Hz) | NA | 0.02 | 0.07 | 0.17 | 0.27 |
| DRI | 0.19 | 0.29 | 0.85 | 7.10 | 38.24 |
| Melt Tension (g) | NM | 0.12 | 2.75 | 3.66 | NA |
| $MS^{150C}$ (cN) | 0.81 | NM | 3.79 | 16.45 | 66.75 |
| MS Improvement | NA | NM | 0.15 | 8.00 | 49.15 |
| Hardness (Type D) | 22 | 22 | 22 | 22 | 22 |
| Tensile Break (psi) | 763.9 | 739.7 | 839.2 | 924.4 | 915.5 |
| Strain at Break (%) | 1118 | 1177 | 1241 | 1203 | 1039 |

*Sample 2 was not reextruded
"NM" means "not measured"
"NA" means "not applicable"
Log η ratio = (log $η_{0.1}$ − log $η_{100}$)/log $η_{100}$
ΔLog η(0.1 Hz) = log $η_{0.1}^m$ − log $η_{0.1}^v$
ΔLog η(100 Hz) = log $η_{100}^m$ − log $η_{100}^v$
MS Improvement = $MS^{150C}$ −72.079 × (log $M_w$)$^2$ + 666.28(log $M_w$) − 1539.5

Example 5: Effect of peroxide addition on low and high shear rate viscosity of Sample 4

Table 7 describes the melt index change and low and high shear viscosity change before and after peroxide treatment of Sample 4:

TABLE 7

| Physical Property | Sample 4 | Sample 4B | Sample 4C | Sample 4D |
|---|---|---|---|---|
| wt % Lupersol ™ 130 | 0.00 | 0.30 | 0.60 | 1.0 |
| Eqs ROOR/1000C | 0.00 | 0.29 | 0.59 | 0.98 |
| Final $I_2$(g/10 min) | 0.90 | 0.13 | 0.03 | NM |
| η(0.1 Hz) Poise | 96900 | 518000 | 850000 | 1480000 |
| η(100 Hz) Poise | 18800 | 17600 | 16320 | 14700 |

TABLE 7-continued

| Physical Property | Sample 4 | Sample 4B | Sample 4C | Sample 4D |
|---|---|---|---|---|
| Log η ratio | 0.17 | 0.35 | 0.41 | 0.48 |
| ΔLog η(0.1 Hz) | NA | 0.72 | 0.94 | 1.18 |
| ΔLog η(100 Hz) | NA | −0.03 | −0.06 | −0.11 |

NM = Not Measured
NA — Not Applicable
Log η ratio =(log η0.1 − $log_{100}$)/log η100
ΔLog η(0.1 Hz) = log $η_{0.1}^m$ − log $η_{0.1}^v$
ΔLog η(100 Hz) = log $η_{100}^m$ − log $η_{100}^v$

Example 6: Effect of peroxide addition on low and high shear rate viscosity of Sample 5

Table 8 describes the melt index change and low and high shear viscosity change before and after peroxide treatment of Sample 5:

TABLE 8

| Physical Property | Sample 5 | Sample 5A | Sample 5B | Sample 5C | Sample 5D | Sample 5E |
|---|---|---|---|---|---|---|
| wt % Lupersol ™ 130 | 0.00 | 0.10 | 0.30 | 0.60 | 1.00 | 1.50 |
| Eqs ROOR/1000C | 0.00 | 0.10 | 0.29 | 0.59 | 0.98 | 1.47 |
| Final $I_2$ (g/10 min) | 0.47 | 0.39 | 0.13 | 0.03 | NM | NM |
| $\eta$(0.1 Hz) Poise | 187000 | 302000 | 608000 | 1000000 | 1650000 | 2060000 |
| $\eta$(100 Hz) Poise | 24500 | 21400 | 19800 | 17520 | 14400 | 13000 |
| Log $\eta$ ratio | 0.19 | 0.26 | 0.35 | 0.41 | 0.50 | 0.53 |
| $\Delta$Log $\eta$(0.1 Hz) | NA | 0.24 | 0.51 | 0.73 | 0.95 | 1.04 |
| $\Delta$Log $\eta$(100 Hz) | NA | −0.01 | −0.09 | −0.15 | −0.23 | −0.28 |

NM = Not Measured
NA = Not Applicable
Log $\eta$ ratio = (log $\eta_{0.1}$ − log $\eta_{100}$)/log $\eta_{100}$
$\Delta$Log $\eta$(0.1 Hz) = log $\eta_{0.1}^m$ − log $\eta_{0.1}^v$
$\Delta$Log $\eta$(100 Hz) = log $\eta_{100}^m$ − log $\eta_{100}^v$ Example 7: Effect of peroxide addition on low and high shear rate viscosity of Samples 4 and 6

Table 9 describes the melt index change and low and high shear viscosity change before and after peroxide treatment of Samples 4 and 6 (having similar melt index but differing density):

TABLE 9

| Physical Property | Sample 4 | Sample 4A | Sample 6 | Sample 6A |
|---|---|---|---|---|
| wt % Lupersol ™ 130 | 0.00 | 0.10 | 0.00 | 0.10 |
| Eqs ROOR/1000C | 0.00 | 0.10 | 0.00 | 0.10 |
| Final $I_2$(g/10 min) | 0.90 | 0.80 | 0.80 | 0.40 |
| Density (g/cm³) | 0.8694 | NM | 0.9015 | NM |
| $\eta$(0.1 Hz) Poise | 96900 | 138000 | 132000 | 285000 |
| $\eta$(100 Hz) Poise | 18,800 | 15,900 | 17,300 | 17,300 |
| Log $\eta$ ratio | 0.17 | 0.22 | 0.21 | 0.28 |
| $\Delta$Log $\eta$(0.1 Hz) | NA | 0.18 | NA | 0.36 |
| $\Delta$Log $\eta$(100 Hz) | NA | −0.06 | NA | 0.05 |

NM = Not Measured
NA = Not Applicable
Log $\eta$ ratio = (log $\eta_{0.1}$ − log $\eta_{100}$)/log $\eta_{100}$
$\Delta$Log $\eta$(0.1 Hz) = log $\eta_{0.1}^m$ − log $\eta_{0.1}^v$
$\Delta$Log $\eta$(100 Hz) = log $\eta_{100}^m$ − log $\eta_{100}^v$ Example 8: Effect of peroxide addition on low and high shear rate viscosity of Samples 6 and 9*

Table 10 describes the melt index change and low and high shear viscosity change before and after peroxide treatment of Samples 6 and 9* (comparing the performance of a heterogeneously branched LLDPE with a SLEP having about the same melt index and density):

TABLE 10

| Physical Property | Sample 6 | Sample 6A | Sample 9* | Sample 9*A |
|---|---|---|---|---|
| wt % Lupersol ™ 130 | 0.00 | 0.10 | 0.00 | 0.10 |
| Eqs ROOR/1000C | 0.00 | 0.10 | 0.00 | 0.10 |
| Final $I_2$(g/10 min) | 0.80 | 0.43 | 0.76 | 0.03 |
| Density (g/cm³) | 0.9015 | NM | 0.9035 | NM |
| $\eta$(0.1 Hz) Poise | 132000 | 285000 | 134000 | 1060000 |
| $\eta$(100 Hz) Poise | 17300 | 17800 | 17,400 | 20,300 |
| Log $\eta$ ratio | 0.21 | 0.28 | 0.25 | 0.40 |

TABLE 10-continued

| Physical Property | Sample 6 | Sample 6A | Sample 9* | Sample 9*A |
|---|---|---|---|---|
| $\Delta$Log $\eta$(0.1 Hz) | NA | 0.36 | NA | 0.73 |
| $\Delta$Log $\eta$(100 Hz) | NA | 0.05 | NA | 0.07 |

NM = Not Measured
NA = Not Applicable
Log $\eta$ ratio = (log $\eta 0.1$ − log$_{100}$)/log $\eta 100$
$\Delta$Log $\eta$(0.1 Hz) = log $\eta_{0.1}^m$ − log $\eta_{0.1}^v$
$\Delta$Log $\eta$(100 Hz) = log $\eta_{100}^m$ − log $\eta_{100}^v$ Example 9: Effect of peroxide addition on low and high shear rate viscosity of Samples 7 and 8

Table 11 describes the low and high shear viscosity change before and after peroxide treatment of Samples 7 and 8:

TABLE 11

| Physical Property | Sample 7 | Sample 7A | Sample 8 | Sample 8A |
|---|---|---|---|---|
| wt % Lupersol ™ | 0.00 | 0.20 | 0.00 | 0.20 |
| Eqs ROOR/1000C | 0.00 | 0.19 | 0.00 | 0.19 |
| $\eta$(0.1 Hz) Poise | 74900 | 4727000 | 20530 | 38080 |
| $\eta$(100 Hz) Poise | 27800 | 35000 | 12220 | 16700 |
| Log $\eta$ ratio | 0.10 | 0.47 | 0.06 | 0.08 |
| $\Delta$Log $\eta$(0.1 Hz) | NA | 1.80 | NA | 0.27 |
| $\Delta$Log $\eta$(100 Hz) | NA | 0.10 | NA | 0.13 |

NM = Not Measured
NA = Not Applicable
Log $\eta$ ratio = (log $\eta 0.1$ − log$_{100}$)/log $\eta 100$
$\Delta$Log $\eta$(0.1 Hz) = log $\eta_{0.1}^m$ − log $\eta_{0.1}^v$
$\Delta$Log $\eta$(100 Hz) = log $\eta_{100}^m$ − log $\eta_{100}^v$ Example 10: Torque data of Sample 8 after low temperature initiation peroxide treatment Table 12 describes the torque response at 120C. on a Haake Rheocord 9000 series equipment before and after peroxide treatment of Sample 8:

TABLE 12

| Percent Lupersol ™ 575 (wt %) | Haake rpm | Initial Haake Torque | Torque at 5 minutes |
|---|---|---|---|
| 0** | NM | NM | NM |
| 0.16 | 10 | 1525 | 1600 |
| 4 | 20 | 2170 | 2270 |

**Melt Processed
NM = Not Measured

Example 11: Die pressure of Sample 3 after peroxide treatment

Table 13 describes the die pressure change before and after peroxide treatment of Sample 3:

TABLE 13

| Physical Property | Sample 3 | Sample 3A | Sample 3B | Sample 3C |
|---|---|---|---|---|
| Wt % Lupersol ™ 130 | 0.00 | 0.10 | 0.30 | 0.60 |
| Eqs ROOR/1000C | 0.00 | 0.10 | 0.29 | 0.59 |
| Final I$_2$(g/10 min) | 4.90 | 3.50 | 1.56 | 0.49 |
| Die Pressure (psi) | 1300 | 1350 | 1400 | 1450 |
| Melt Temp. @ Die (C.) | 128 | 128 | 133 | 133 |

Example 12: Die pressure of Sample 4 after peroxide treatment

Table 14 describes the die pressure change before and after peroxide treatment of Sample 4:

TABLE 14

| Physical Property | Sample 4 | Sample 4A | Sample 4B |
|---|---|---|---|
| Wt % Lupersol ™ 130 | 0.00 | 0.10 | 0.30 |
| Eqs ROOR/1000C | 0.00 | 0.10 | 0.29 |
| Final I$_2$(g/10 min) | 0.90 | 0.84 | 0.13 |
| Die Pressure (psi) | 1700 | 1700 | 1750 |
| Melt Temp. @ Die (C.) | 159 | 159 | 160 |

Example 13: Die pressure comparison of Samples 6 and 9* after peroxide treatment Table 15 describes the die pressure change before and after peroxide treatment of Samples 6 and 9* (comparing the performance of a heterogeneously branched LLDPE with a SLEP having about the same starting melt index and density):

TABLE 15

| Physical Property | Sample 6 | Sample 6A | Sample 9* | Sample 9*A |
|---|---|---|---|---|
| Wt % Lupersol ™ 130 | 0.00 | 0.10 | 0.00 | 0.10 |
| Eqs ROOR/1000C | 0.00 | 0.10 | 0.00 | 0.10 |
| Final I$_2$(g/10 min) | 0.80 | 0.43 | 0.76 | 0.03 |
| Die Pressure (psi) | 1400 | 1500 | 1600 | 1850 |
| Melt Temp. @ Die (C.) | 212 | 212 | 174 | 174 |

This data shows that when 0.1 wt % peroxide crosslinking agent is added to Sample 6 according to this invention, there is only a 100 psi increase in die pressure, while the same amount of peroxide crosslinker added to Sample 9* (Attane™, a heterogeneous ethylene polymer) results in a 250 psi increase in die pressure. This die pressure increase generally is an indication of greater high shear viscosity, since polymer extrusion is a high shear phenomenon.

Example 14: Percent gel determination for Sample 5 at 1.5% peroxide level

Percent gel is determined for Sample 5 after modification using 1.5% peroxide (as described in Example 6). Percent gel is determined using ASTM D 2765 Method A, the disclosure of which is incorporated herein by reference. This sample had the lowest starting melt index and as such, after reacting with the highest percent peroxide, would be expected to have the highest percent gel (i.e., the highest molecular weight fraction which had converted to gel). Surprisingly, Sample 5, after modification with 1.5% peroxide, still has less than 0.5% gel (which is the lower test limit for this method). Accordingly, all other examples of the invention which are peroxide (or irradiation) modified have less than 0.5% gel, since all other examples either used less peroxide and/or had higher melt indices (i.e., lower molecular weight, meaning that there should be less likely gel formation, all other parameters being relatively the same).

Example 15: Comparison of the Effect of Radiation and Peroxide Modification on Profile Extrusion Table 16 shows data obtained on profile extrusion of refrigerator door gaskets using Sample 1 modified by γ particle bombardment, β particle (i.e., electron beam) bombardment, and peroxide. In each case, Sample 1 was modified to reduce its melt index to 10. For γ particle bombardment Sample 1 was exposed to a 2 Mrad dose of γ radiation from a $^{60}$Co source, for β particle bombardment Sample 1 was exposed to a 2 Mrad dose of β radiation in the form of an electron beam and for peroxide modification Lupersol 130 was melt processed with Sample 1 as described above for Examples 2–12 in an amount sufficient to reduce the melt index of Sample 1 to 10.

TABLE 16

| Cross-linking Agent | MI | Density (g/cc) | Melt Temp (° F.) | Output (lb/ hr) | Linespeed (ft/ min) | Shear Rate (s$^{-1}$) | Surface Quality | Enough Melt Strength |
|---|---|---|---|---|---|---|---|---|
| γ | 10 | 0.88 | 290 | 90.0 | 51.9 | 6226 | Acceptable | Yes |
| γ | 10 | 0.88 | 250 | 92.6 | 54.0 | 6485 | Slight Mf* | Yes |
| β | 10 | 0.88 | 290 | 88.2 | 50.8 | 6101 | Acceptable | Yes |
| β | 10 | 0.88 | 250 | 86.6 | 49.9 | 5994 | Acceptable | Yes |
| ROOR | 10 | 0.88 | 295 | 87.7 | 50.6 | 6068 | Acceptable | Yes |
| ROOR | 10 | 0.88 | 260 | 97.2 | 56.0 | 6724 | Acceptable | Yes |

*Slight melt fracture (MF) in die lines.
**Enough melt strength means that the melt strength was sufficient to hold the shape of the extruded profile after the polymer exited the extruder die.

This data shows that similar throughput is achieved for a given shear rate, surface quality and melt strength when using different crosslinking agents to rheology modify Sample 1. It was not possible to extrude a profile using unmodified Sample 1, since it had too little melt strength to hold a profile. The combination of the high shear rate, surface quality and line speed with enough melt strength is particularly surprising for a polymer free of external processing aids as in this case.

The Table 16 data also illustrates that the advantages of this invention are provided at different melt temperatures. This indicates a wide processing parameter window, allowing more flexibility in extrusion conditions.

Although the invention has been described in considerable detail through the preceding specific embodiments, it is to be understood that these embodiments are for purposes of illustration only. Many variations and modifications can be made by one skilled in the art without departing from the spirit and scope of the invention.

We claim:

1. A rheology-modified ethylene polymer having less than 0.5 wt % gel as measured via ASTM D2765, Procedure A, a Composition Distribution Branch Index (CDBI) greater than 50 percent and a molecular weight distribution less than 4.0, provided that when the rheology-modified ethylene polymer comprises a heterogeneous ethylene polymer, the heterogeneous ethylene polymer has a density in the range from about 0.87 g/cm$^3$ to about 0.935 g/cm$^3$, which rheology-modified ethylene polymer is characterizable by at least one of the following equations:

$$Z \leq (\log \eta_{0.1} - \log \eta_{100})/\log \eta_{100} \quad (I)$$

$$\log t_0 = m \cdot \log (\eta_0) - b \quad (II)$$

$$K \leq MS^{150\ C} - 72.079 \times (\log M_w)^2 + 666.28 \times (\log M_w) - 1539.5 \quad (III)$$

wherein $\eta_0$ is the zero shear rate viscosity of the polymer, $\eta_{0.1}$ is the viscosity of the polymer measured at 190 C. and a shear rate of 0.1 radians/second, $\eta_{100}$ is the viscosity of the polymer at a shear rate of 100 radian/second, $t_0$ is the relaxation time of the polymer, Z is a number having a value of at least 0.30, m is a number having a value greater than or equal to 1.070, b is a number having a value less than or equal to 5.950, K is a number equal to at least 0.50 cN, $MS^{150C}$ is the melt strength of the rheology-modified polymer in cN measured at 150 C. and $M_w$ is the weight average molecular weight of the rheology-modified polymer.

2. The polymer of claim 1 wherein the polymer is a substantially linear ethylene polymer.

3. The polymer of claim 1 which is characterizable by equation (I) in which Z is 0.34.

4. The polymer of claim 1 which is characterizable by equation (II) wherein m is greater than or equal to 1.080 and b is less than or equal to 5.900.

5. The polymer of claim 1 which is chacterizable by equation (III) wherein K is 1.00 cN.

6. The polymer of claim 1 which is characterizable by at least two of equations (I), (II) and (III).

7. The polymer of claim 1 which is characterizable by equations (I), (II) and (III).

* * * * *